US007987132B2

(12) United States Patent
Payne et al.

(10) Patent No.: US 7,987,132 B2
(45) Date of Patent: Jul. 26, 2011

(54) COMPUTER BASED SYSTEM FOR PRICING AN INDEX-OFFSET DEPOSIT PRODUCT

(75) Inventors: Richard C. Payne, Mississauga (CA); John Adam Rose, Toronto (CA); Marc G. Verrier, Caledon (CA)

(73) Assignee: Genesis Financial Products, Inc., Mississauga (CA)

( * ) Notice: Subject to any disclaimer, the term of this patent is extended or adjusted under 35 U.S.C. 154(b) by 42 days.

(21) Appl. No.: 12/538,488

(22) Filed: Aug. 10, 2009

(65) Prior Publication Data
US 2009/0313050 A1    Dec. 17, 2009

Related U.S. Application Data

(63) Continuation of application No. 10/463,180, filed on Jun. 16, 2003, now Pat. No. 7,590,581.

(51) Int. Cl.
*G06Q 40/00*    (2006.01)
(52) U.S. Cl. ........................................ 705/36 R; 705/37
(58) Field of Classification Search ........... 705/36 R–37
See application file for complete search history.

(56) References Cited

U.S. PATENT DOCUMENTS

| | | | |
|---|---|---|---|
| 6,343,272 B1* | 1/2002 | Payne et al. | ........................ 705/4 |
| 6,434,272 B1 | 8/2002 | Saarelma | |
| 7,590,581 B1* | 9/2009 | Payne et al. | ................. 705/36 R |

OTHER PUBLICATIONS

Aho, Alfred V. and Jeffrey D. Ullman, "Principles of Compiler Design" 1977, pp. 491-497.
Booth, R., "Inner Loops", 1997, pp. 235-236.
Duan, Jin-Chuan, Genvieve Gauthier and Jean-Guy Simonato, "An Analytical Approximation for the GARCH Option Pricing Model", 2001, pp. 75-116.
Elton, Edwin J. and Martin J. Gruber, "The Management of Bond Portfolios", Chapter 19 of "Modern Portfolio Theory and Investment Analysis", 4th Ed., 1991, pp. 542-572.
Espen Gaarder Haug, "The complete guide to option pricing formulas", 1997, pp. 97-102.
Ferrenberg, Landau and Wong, "Monte Carlo Simulations: Hidden Errors from "Good" Random Number Generators", 1992, pp. 3382-3384.
Gerber, Richard, "The Software Optimization Cookbook", Intel Press, 2002.
Golub G.H. and C. Reinsch, Singular Value Decomposition and Least-Squares Solutions in J.H. Wilkinson and C. Reinsch (editors) Handbook for Automatic Computation, vol. II: "Linear Algebra", Springer Verlag, 1974, pp. 134-151.

(Continued)

*Primary Examiner* — Thu Thao Havan
(74) *Attorney, Agent, or Firm* — McDonnell Boehnen Hulbert & Berghoff LLP

(57) ABSTRACT

A computer-based method for determining a value of an index-offset deposit product, having a principal amount P, a term T, a specified guaranteed amount G, and an index credit C, comprising:
  d) setting trial values for fixed-income-linked crediting parameters for said product implying an expected fixed-income-linked credit component F at the end of the term T;
  e) determining a cost for an equity option paying equity-linked credit component E such that the index credit C=E+F, to be paid at T, together with the principal P, is at least equal to G; and
  f) summing said equity option cost, present value of principal, and present value of fixed-income-linked credit component to determine said value of said index-offset deposit product.

22 Claims, 7 Drawing Sheets

OTHER PUBLICATIONS

Golub and Van Loan, "Matrix Computations", 1989, pp. 430-436.

Hunter, C.J., P. Jackel, and M.S. Joshi, "Drift Approximations in a Forward-Rate-Based LIBOR Market Model", 2001, pp. 1-3.

"Intel Architecture Optimization Reference Manual", Intel, 1998.

Kloeden, Peter E. and Eckhard Platen, "Numerical Solution of Stochastic Differential Equations:", Springer Verlag, 1995, pp. 221-226.

Liu, Jun, Francis A. Longstaff and Ravit E. Mandell, "The Market Price of Credit Risk: An Empirical Analysis of Interest Rate Swap Spreads", 2000, pp. 1-10.

Marsaglia, George and Wai Wan Tsang, "The Ziggurat Method for Generating Random Variables", 2000, pp. 1-7.

McKay, M.D., R.J. Beckman and W.J. Conover, "A comparison of three methods for selecting values of input variables in the analysis of output from a computer code", Technometrics, 1979, 21(2), pp. 239-245.

Neftci, Salih N,. "An Introduction to the Mathematics of Financial Derivatives" 2001.

Press, William H., William T. Vetterling, Saul A. Teukolsky, Brian P. Flannery, "Numerical Recipes in C", Cambridge University Press, 1992, pp. 309-315.

Salzberg, Betty Joan, "File Structures: An Analytic Approach", 1988, pp. 20-25.

Sedgewick, Robert, Algorithms, 1983, pp. 115-124.

\* cited by examiner

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |

Resulting Zero Yields: 1.340  1.726  2.188  3.106  3.667  4.130  5.259

NA-GARCH Equity Parameters c  1.1626318    lambda  0.050674    beta0  2.15587e-6    beta1  0.899101 beta2  0.0375993    obs/yr  253    div  1.25    InstVol  25

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc  100    Equity Alloc  0    Equity Participation Rate  100

Treasury Participation

| | | 1 | 2 | 3 | 4 | 5 | 6 | 7 |
|---|---|---|---|---|---|---|---|---|
| Base Rate | 3.68 | | | | | | | |
| | | Floor Rate | 2.00 | 2.00 | 2.00 | 2.00 | 2.00 | 2.00 | 2.00 |
| Upside | 0.00 | Cap Rate | 99.00 | 99.00 | 99.00 | 99.00 | 99.00 | 99.00 | 99.00 |
| Downside | 0.00 | Avg Credit | 3.680 | 3.680 | 3.680 | 3.680 | 3.680 | 3.680 | 3.680 |

Vol vs. Historical (1978-2000)  3.00    Scenarios  50000    Get PV    PV  1.00090    Delta  0.00000

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.9843 | -0.9768 | -0.9672 | -0.9587 | -0.9499 | -0.9516 | -0.9461 | 0.0021 |

| 9 | 10 | 11 | 12 | 13 | 14 | 15 |
|---|---|---|---|---|---|---|
| -0.0037 | 0.0020 | -0.0050 | 0.0021 | 0.0130 | 0.0207 | 0.0000 |

Get Exposures

Fig. 1

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |

| Resulting Zero Yields | 1.340 | 1.726 | 2.188 | 3.106 | 3.667 | 4.130 | 5.259 |
|---|---|---|---|---|---|---|---|

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc 100   Equity Alloc 0   Equity Participation Rate 100

Treasury Participation

| | | | 1 | 2 | 3 | 4 | 5 | 6 | 7 |
|---|---|---|---|---|---|---|---|---|---|
| Base Rate | 1.72 | Floor Rate | 1.72 | 1.72 | 1.72 | 1.72 | 1.72 | 1.72 | 1.72 |
| Upside | 1.00 | Cap Rate | 99.00 | 99.00 | 99.00 | 99.00 | 99.00 | 99.00 | 99.00 |
| Downside | 1.00 | Avg Credit | 1.720 | 2.424 | 2.759 | 2.998 | 3.110 | 3.215 | 3.380 |

Vol vs. Historical (1978-2000) 3.00   Scenarios 50000   Get PV   PV 0.99908   Delta 0.00000

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.9843 | -0.8741 | -0.7550 | -0.6342 | -0.5174 | -0.4017 | -0.2889 | 0.8678 |
| 9 | 10 | 11 | 12 | 13 | 14 | 15 | |
| 0.7469 | 0.6339 | 0.4552 | 0.3319 | 0.2020 | 0.0387 | 0.0000 | Get Exposures |

Fig. 2

Capital Protection Annuity - Interactive Pricing - Version 1.2

Current Yield Curve

| | 1 | 2 | 3 | 5 | 7 | 10 | 20 | Assumed Coupon | |
|---|---|---|---|---|---|---|---|---|---|
| (Coupon) Treasury Yields | 1.34 | 1.72 | 2.17 | 3.05 | 3.58 | 4.01 | 4.93 | 3.00 | Strip |
| Resulting Zero Yields | 1.340 | 1.726 | 2.188 | 3.106 | 3.667 | 4.130 | 5.259 | | |

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc 50   Equity Alloc 50   Equity Participation Rate 100

Treasury Participation

| | | 1 | 2 | 3 | 4 | 5 | 6 | 7 |
|---|---|---|---|---|---|---|---|---|
| Base Rate | 4.00 | Floor Rate | 4.00 | 4.00 | 4.00 | 4.00 | 4.00 | 4.00 | 4.00 |
| Upside | 0.00 | Cap Rate | 99.00 | 99.00 | 99.00 | 99.00 | 99.00 | 99.00 | 99.00 |
| Downside | 0.00 | Avg Credit | 4.000 | 4.000 | 4.000 | 4.000 | 4.000 | 4.000 | 4.000 |

Vol vs. Historical (1978-2000) 3.00   Scenarios 50000   Get PV   PV 1.00025   Delta 0.40909

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.5820 | -0.5716 | -0.5570 | -0.5501 | -0.5418 | -0.5438 | -0.5498 | -0.0039 |

| 9 | 10 | 11 | 12 | 13 | 14 | 15 |
|---|---|---|---|---|---|---|
| -0.0100 | -0.0067 | -0.0155 | -0.0050 | 0.0067 | 0.0169 | 0.0000 |

Get Exposures

Fig. 3

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |

Resulting Zero Yields: 1.340  1.726  2.188  3.106  3.667  4.130  5.259

NA-GARCH Equity Parameters c: 1.1626318   lambda: 0.050674   beta0: 2.15587e-6   beta1: 0.899101 beta2: 0.0375993   obs/yr: 253   div: 1.25   InstVol: 25

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc: 50    Equity Alloc: 50    Equity Participation Rate: 100

Treasury Participation

| | | 1 | 2 | 3 | 4 | 5 | 6 | 7 |
|---|---|---|---|---|---|---|---|---|
| Base Rate | 1.63 | | | | | | | |
| | | Floor Rate | 1.63 | 1.63 | 1.63 | 1.63 | 1.63 | 1.63 | 1.63 |
| Upside | 1.00 | Cap Rate | 99.00 | 99.00 | 99.00 | 99.00 | 99.00 | 99.00 | 99.00 |
| Downside | 1.00 | Avg Credit | 1.630 | 2.334 | 2.669 | 2.908 | 3.020 | 3.125 | 3.290 |

Vol vs. Historical (1978-2000): 3.00   Scenarios: 50000   Get PV   PV 1.00034   Delta 0.38991

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.5976 | -0.5452 | -0.4885 | -0.4272 | -0.3750 | -0.3283 | -0.2897 | 0.3471 |

| 9 | 10 | 11 | 12 | 13 | 14 | 15 |
|---|---|---|---|---|---|---|
| 0.2962 | 0.2562 | 0.1726 | 0.1304 | 0.0877 | 0.0313 | 0.0000 |

Get Exposures

Fig. 4

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |

| Resulting Zero Yields | 1.340 | 1.726 | 2.188 | 3.106 | 3.667 | 4.130 | 5.259 |
|---|---|---|---|---|---|---|---|

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

| Treas Alloc | 50 | Equity Alloc | 50 | Equity Participation Rate | 75 |
|---|---|---|---|---|---|

Treasury Participation

| | | 1 | 2 | 3 | 4 | 5 | 6 | 7 |
|---|---|---|---|---|---|---|---|---|
| Base Rate | 2.96 | Floor Rate | 2.96 | 2.96 | 2.96 | 2.96 | 2.96 | 2.96 | 2.96 |
| Upside | 1.00 | Cap Rate | 99.00 | 99.00 | 99.00 | 99.00 | 99.00 | 99.00 | 99.00 |
| Downside | 1.00 | Avg Credit | 2.960 | 3.664 | 3.999 | 4.238 | 4.350 | 4.455 | 4.620 |

| Vol vs. Historical (1978-2000) | 3.00 | Scenarios | 50000 | Get PV | PV | 1.00012 |
|---|---|---|---|---|---|---|
| | | | | | Delta | 0.31698 |

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.6754 | -0.6158 | -0.5530 | -0.4906 | -0.4300 | -0.3721 | -0.3220 | 0.4162 |

| 9 | 10 | 11 | 12 | 13 | 14 | 15 |
|---|---|---|---|---|---|---|
| 0.3545 | 0.3029 | 0.2089 | 0.1575 | 0.1003 | 0.0257 | 0.0000 |

Get Exposures

Fig. 5

COMPUTER BASED SYSTEM FOR PRICING AN INDEX-OFFSET DEPOSIT PRODUCT

FIELD OF THE INVENTION

The present invention relates generally to financial products, more specifically to computer-based systems for pricing financial products, and, even more particularly, to a computer-based system for pricing an index-offset deposit product.

BACKGROUND OF THE INVENTION

A call option is a financial instrument that gives its holder the right (but not the obligation) to purchase a given security at a pre-specified price, called the strike price or exercise price, from the option seller. This structure allows the option holder to profit if the price of the security exceeds the strike price at the time of expiry of the option. At the same time, the maximum possible loss to the holder is limited to the price paid for the option if the security is worth less than the exercise price, since the holder is not forced to buy the security at an above-market price.

Options usually have a limited lifespan (the term) and have two main styles of exercise, American and European. In an American-exercise call option, the security may be purchased for its strike price at any time during the term. In a European-exercise call option, in contrast, the security may only be purchased at the end of the term.

An equity-indexed call option is one in which the role of "securities price" is played by an equity index such as the S&P 500 or the Nasdaq 100. Since delivering the basket of securities that comprise the equity index is usually impractical, equity-indexed call options are usually cash-settled. This means that if the equity index is greater than the strike price at time of exercise, the option seller pays the option holder the difference in price in cash: if the equity index is less than or equal to the strike, no payment is made.

Many investors currently purchase equity-indexed call options directly to help achieve a desired balance of risk and return in their investment portfolios. Many investors and consumers also benefit indirectly from investments in such options when they buy equity-linked deposit products such as equity-indexed annuities or equity-indexed certificates of deposit (CD's). This is because equity-linked deposit products are usually constructed from a mixture of equity-indexed call options and fixed-income instruments such as bonds or mortgages.

Investors and consumers obtain valuable benefits through the use of equity-linked deposit products currently available in the market, such as:
The ability to benefit from increases in the equity index while protecting principal; and
Achievement of diversification by linking investment returns to an equity index aggregating the performance of multiple issuers, rather than just one.

There are also some disadvantages associated with currently available equity-linked products, including:
The lack of fixed-income linkage, i.e., the inability to take advantage of increases in interest rates after product purchase, because returns are tied to one equity index for the length of the term; and,
Lower-than-desired "participation rates" (the proportion of increases in the equity index credited to the product), especially during times of low interest rates or high equity index volatility.

The last point may require explanation. Participation rates are low when interest rates are low because most of the amount deposited must be invested in fixed income to guarantee return of principal, leaving little left over to buy equity-indexed options. Similarly, higher equity index volatility leads to higher option prices for the most common types of options, driving participation rates down.

The investor or consumer therefore must face the situation that achievement of equity participation and a guarantee of principal generally precludes earning an attractive interest rate. A difficult choice must be made.

References useful in understanding the present invention include:
*An Introduction to the Mathematics of Financial Derivatives*, Salih N. Neftci (2001)
*Financial Calculus*, Martin Baxter and Andrew Rennie (1996)
*Martingale Methods in Financial Modelling*, Marek Musicla and Marek Rutkowski (1997)
*Changes of Numeraire, Changes of Probability Measure and Option Pricing*, Geman, H., El Karoui, N. and Rochet, J. C. (1995)
*Arbitrage Theory in Continuous Time*, Tomas Bjork (1998)
*Beyond average intelligence*, Michael Curran, Risk 5 (10), (1992)
*The complete guide to option pricing formulas*, Espen Gaarder Haug, 1997
*Measuring and Testing the Impact of News on Volatility*, Robert F. Engle & Victor K. Ng (1993)
*Option Pricing in ARCH-Type Models*, Jan Kallsen & Murad S. Taqqu (1994)
*The GARCH Option Pricing Model*, Jin-Chuan Duan (1995)
*Pricing Options Under Generalised GARCH and Stochastic Volatility Processes*, Peter Ritchken & Rob Trevor (1997)
*An Analytical Approximation for the GARCH option pricing model* by Jin-Chuan Duan, Geneviéve Gauthier, and Jean-Guy Simonato (2001)
*The Market Model of Interest Rate Dynamics*, Alan Brace, Dariusz Gatarek, and Marek Musiela (1997)
*A Simulation Algorithm Based on Measure Relationships in the Lognormal Market Models*, Alan Brace, Marek Musiela, and Erik Schlogl (1998)
*LIBOR and swap market models and measures*, Farshid Jamshidian (1997)
*Interest Rate Models Theory and Practice*, Damiano Brigo & Fabio Mercurio (2001)
*Drift Approximations in a Forward-Rate-Based LIBOR Market Model*, C. J. Hunter, P. Jäckel, and M. S. Joshi (2001)
*The Market Price of Credit Risk: An Empirical Analysis of Interest Rate Swap Spreads* by Jun Liu, Francis A. Longstaff, and Ravit E. Mandell (2000)
*Modern Pricing of Interest-Rate Derivatives*, Riccardo Rebonato (2002)
*An Empirical Comparison of GARCH Option Pricing Models*, K. C. Hsieh, Peter Ritchken (2000)
*Modern Portfolio Theory and Investment Analysis* (4$^{th}$ ed.), Edwin J. Elton and Martin J. Gruber (1991)
*The Art of Computer Programming*, Vol. 2, Donald E. Knuth, Addison-Wesley (1969)
*The Art of Computer Programming*, Vol. 3, Donald E. Knuth, Addison-Wesley (1973)
*Algorithms*, Robert Sedgewick (1983)
*Handbook of Mathematical Functions* (AMS55) Milton Abramowitz and Irene A. Stegun (1972)
*Matrix Computations*, Gene H. Golub and Charles F. Van Loan (1989)

*Numerical Methods*, Germund Dahlquist and Ake Bjorck, Prentice-Hall (1974)

*Algorithms for Minimization without Derivatives*, R. P. Brent, Prentice-Hall (1973)

*Numerical Recipes in C*, William H. Press, William T. Vetterling, Saul A. Teukolsky, Brian P. Flannery, Cambridge University Press, 1992

*Numerical Solution of Stochastic Differential Equations* Peter E. Kloeden and Eckhard Platen, (1995)

*Stochastic Simulation*, Brian D. Ripley, Wiley (1987)

*Intel Architecture Optimization Reference Manual*, Intel (1998)

*Inner Loops* by Rick Booth (1997)

*The Software Optimization Cookbook*, Richard Gerber, Intel Press (2002)

*Principles of Compiler Design* by Alfred V. Aho and Jeffrey D. Ullman (1977)

*File Structures: An Analytic Approach*, Betty Joan Salzberg (1988)

*A Very Fast Shift-Register Sequence Random Number Generator*, Scott Kirkpatrick and Erich P. Stoll, Journal of Computational Physics 40, (1981) 517-526

*Monte Carlo Simulations: Hidden Errors from "Good" Random Number Generators*, A. M. Ferrenberg, Y. J. Wong, and D. P. Landau (1992)

*The Ziggurat Method for Generating Random Variables*, George Marsaglia and Wai Wan Tsang (2000)

*Remark on Algorithm 659: Implementing Sobol's quasirandom sequence generator*, Stephen Joe and Frances Y. Kuo, ACM Transactions on Mathematical Software, March 2003

*A comparison of three methods for selecting values of input variables in the analysis of output from a computer code*, M. D. McKay, R. J. Beckman, and W. J. Conover, *Technometrics*, 21(2):239-245, (1979)

*Elements of Sampling Theory*, Vic Barnett (1974)

*Singular Value Decomposition and Least-Squares Solutions* G. H. Golub and C. Reinsch, in J. H. Wilkinson and C. Reinsch (editors), *Handbook for automatic computation vol. II: "Linear Algebra"*, Springer Verlag (1974)

Accordingly, there is a long-felt need for an indexed deposit product structure permitting the purchaser to enjoy an attractive combination of equity-linkage and fixed-income-linkage while guaranteeing a specified percentage of principal. There is correspondingly a long-felt need for a computer-based system for pricing such an indexed deposit product structure.

SUMMARY OF THE INVENTION

The present invention comprises a computer-based method for determining a value of an index-offset deposit product, having a principal amount P, a term T, a specified guaranteed amount G, and an index credit C, comprising a) setting trial values for fixed-income-linked crediting parameters for said product implying an expected fixed-income-linked crediting component F at the end of the term T, b) determining a cost for an equity option paying equity-linked credit component E such that the index credit C=E+F, to be paid at T, together with the principal P, is at least equal to G; and c) summing said equity option cost, present value of principal, and present value of fixed-income-linked crediting component to determine said value of said index-offset deposit product.

BRIEF DESCRIPTION OF THE DRAWINGS

The nature and mode of operation of the present invention will now be more fully described in the following detailed description of the invention taken with the accompanying drawing figures, in which:

FIG. 1 is a screen shot which shows how the program can be used to calculate the rate sensitivities of a traditional rate annuity;

FIG. 2 is a screen shot which shows how the program can be used to calculate the price and interest rate sensitivities of a product with fixed income linked index credits with the equity index allocation still at zero;

FIG. 3 is a screen shot which shows how the program can be used to calculate the price and interest rate sensitivities of a product with a constant base rate and with an equity index allocation of 50%;

FIG. 4 is a screen shot which shows how the program can be used to calculate the price and interest rate sensitivities of a product with a treasury linked base rate and with an equity index allocation of 50%;

FIG. 5 is a screen shot similar to that of FIG. 4 but showing that an equity participation rate of 75% has been introduced;

DETAILED DESCRIPTION OF THE PREFERRED EMBODIMENT

General Description

Figure 6:
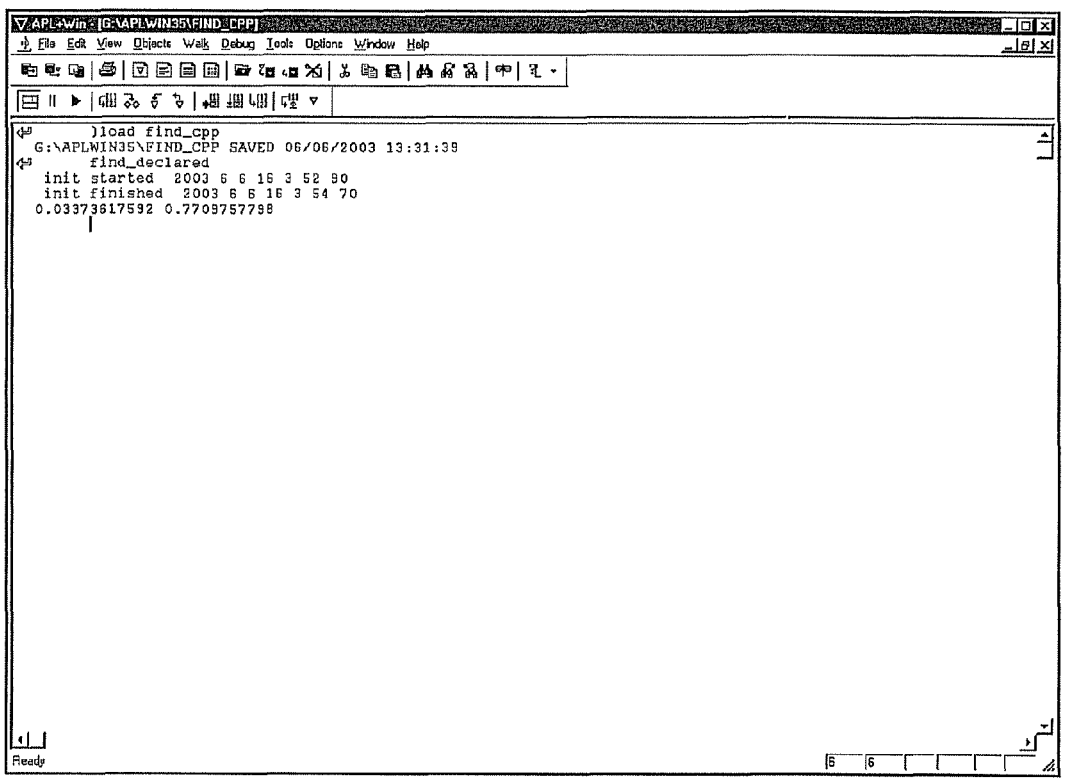
FIG. 6 is a screen print illustrating the method of operation of the find_cpp operation; and, FIG. 7 is a screen print illustrating the method of operation of the cpp_patc operation.

A brief description of an index-offset deposit product is one that provides the purchaser with a notional allocation of principal to equity-linked and fixed-income-linked allocations and two guarantees:

a guarantee that a specified percentage (often 100%) of principal will be paid to the holder at the end of a specified term, and a guarantee that the index credit computed from the equity-linked and fixed-income-linked index credit components at the end of the term will be non-negative, i.e., that positive and negative index credit components from the equity-linked and fixed-income-linked notional allocations can offset each other so long as the index credit itself is nonnegative.

The index credit component for the equity-linked notional allocation will normally be based on a published equity index such as the S&P 500 index or NASDAQ index. The index credit component for the fixed-income-linked notional allocation may be based on a Treasury-based or Libor-based interest rate (external index) or may be based on rates declared by the issuer (internal index). We refer to a Constant Maturity Treasury rate and zero-coupon bond yields below for the fixed-income-linked notional allocation for the sake of concreteness, but the extension to different external and internal interest indices is straightforward.

Having defined a generic index-offset deposit product, we can define specific index-offset deposit products, such as deferred annuities, life insurance, certificates of deposit, and bonds, as specializations of the generic product. Index credits for such products are calculated from fixed income and equity-indexed notional allocations and index credit component parameters, with a guarantee that a specified percentage of principal will be paid at the end of the term.

The index-offset deposit product has some features in common with equity-indexed deposit structures that have previously been described in the literature, (see, e.g., U.S. Pat. No. 6,343,272, a system for managing equity-indexed life and annuity policies). However, there are important differences between the present invention and prior products, which lead to the present invention being a more efficient product, i.e., providing a more attractive combination of equity-linkage and fixed-income linkage under the constraint that a specified percentage of principal must be guaranteed. The key differences are:

The notional equity-linked and fixed-income-linked allocation of principal, and

The guarantee that the index credit itself, although not each index credit component separately, will be nonnegative.

These differences make the product more difficult to price than existing equity-indexed products, especially in the general case in which the fixed-income-linked credit component is indexed to a Treasury or Libor-based rate, because the interest-rate and equity-market risks interact. Key interactions include:

the dependence of arbitrage-free pricing for equity options on realized short-term risk-free interest rates, so that equity exposures vary depending on the shape, level, and volatility of the yield curve, and the fact that the index credit at the end of the term, and hence interest rate exposures, depend on the expected index credit component from the equity-linked notional allocation, because of the potential for offset between the equity-linked and fixed-income-linked index credit components.

Pricing a product with such interactions requires the development of software specifically designed to take these interacting risks into account.

Detailed Description of Product Mechanics

The principal paid for the index-offset deposit product is notionally allocated to the equity-linked allocation and the fixed-income-linked allocation. The notional allocation percentages are determined by the issuer, not the purchaser, and might be (for example) 50% each.

Equity-linked and fixed-income-linked credit components are determined over each term and the index credit is calculated at the end of the term. The length of the term might be 5 to 7 years for a typical product.

The fixed-income-linked credit component is determined by compounding together the "base rates" for each year of the term. In this compounding, the base rate is taken to be at least as large as a specified floor rate (e.g., 2%, varying by year of the term), but no larger than a specified cap rate (e.g., 8%, once again varying by year of the term).

The base rate for the first year of the term is declared by the issuer (e.g., 2%). At successive intervals during the term (e.g., annually), the base rate changes by a percentage of the change in a benchmark yield, such as the 5-Year Constant Maturity Treasury rate, or the yield on a 5-year zero-coupon bond. Different percentages (participation rates) may apply to increases and decreases, and the percentages may be positive or negative.

For example, suppose the upward percentage is 100%, the downward percentage is 50%, the base rate in the first year is 3%, and the term is seven years. The 5-Year CMT rate at issue is 3.5%. If, at the first anniversary, the 5-Year CMT rate is 4.5%, then the base rate for the second year will be 3%+1*(4.5%-3.5%)=4%. If, on the other hand, the 5-Year CMT rate has declined to 2.5% at the first anniversary, then the base rate for the second year will be 3%+0.5*(2.5%-3.5%)=2.5%.

The equity-indexed credit component is based on a percentage (e.g., 100%) of the (signed) increase in the equity index over the term, measured from the starting point to the end value, or to an average value such as the weekly average of the index over the last quarter (3 months) of the term.

The interaction between the two index credit components is that a decrease in the equity index can offset the interest-indexed credit component: however, a specified percentage of principal is guaranteed (e.g., the index credit itself cannot be negative). For example, assume that 50% of the deposit is notionally allocated to fixed-income-linked and 50% is notionally allocated to equity-linked. If the interest-indexed credit component at the end of the term were 20% of the original deposit, and the equity index were down 12%, then the index credit would be 20%-0.5*12%=14% of premium: conversely, if the equity index were up 12%, then the index credit would be 20%+0.5*12%=26% of premium.

Risk Management Considerations

Risk management for deposit products usually requires attention to the equity-market exposures created by the product (for equity-linked products) and to the interest-rate exposures created by the product (for fixed-income-linked and equity-linked products). Risk management considerations for the current invention are more complicated than for currently available products in at least three ways:

Sensitivity to Forward Interest Rates

Deposit-taking institutions such as banks and insurance companies have typically managed their assets and liabilities to try to minimize the difference between asset duration and convexity and liability duration and convexity. A good discussion of duration and convexity for deposit products is found in *The Management of Bond Portfolios* (Chapter 19 of *Modern Portfolio Theory and Investment Analysis*, by Edwin J. Elton and Martin J. Gruber).

Use of duration and convexity for insurance carriers, for example, is so widely accepted that it has been formalized in regulations such as New York Regulation 127, which uses Macaulay duration as the criterion for determining how well the assets and liabilities of a carrier are matched.

Duration and convexity measures, which assume parallel shifts in the yield curve, are not very useful in managing a more general fixed-income-linked product like the current invention. The interest-rate exposure created by indexing to, for example, a Constant Maturity Treasury, is considerably different than the exposure arising from guaranteeing a fixed interest rate.

Measuring the sensitivity of the market value of the liability to changes in individual forward rates is a more generally useful methodology than measuring duration and convexity. The following example (for a five-year term) shows the difference in sensitivity to forward interest rates for a fixed-income-linked product with no equity-linkage:

| Forward Rate | GIC | Fixed-Income Linked |
|---|---|---|
| 1 | −0.98 | −0.98 |
| 2 | −0.98 | −0.77 |
| 3 | −0.97 | −0.55 |
| 4 | −0.96 | −0.37 |
| 5 | −0.95 | −0.21 |
| 6 | 0.00 | 0.75 |
| 7 | 0.00 | 0.55 |
| 8 | 0.00 | 0.33 |
| 9 | 0.00 | 0.16 |
| 10 | 0.00 | 0.00 |
| Total | −4.84 | −1.09 |

The "Total" row shows duration, as traditionally measured. For a traditional deposit product, like a Guaranteed Investment Contract (GIC) the total is useful information, showing essentially the duration of a zero-coupon bond broken out by the forward rates. The total in the Fixed-Income Linked exposures (which assume 100% linkage to upward moves in the 5-Year CMT rate and 50% linkage to downward moves) is not very useful, as it is a sum of positive and negative components that are not level by forward period. Backing a five-year GIC with a five-year zero-coupon bond would achieve a good asset/liability match, but backing the above fixed-income-linked product with a 1.1 year bond would be very risky if the yield curve were to steepen.

Forward Rate/Equity Index Interaction

Interest-rate exposures for equity options are usually captured by a measure called rho, which assumes (like duration and convexity) that yield curve shifts are parallel. For this product, these interest rate exposures must be broken out by individual forward rates in the same way as in the previous item, to allow them to be managed properly under the assumption that yield curve shifts need not be parallel.

Equity-Index/Credited Interest Interaction

The simple example above does not take into account the interaction between the equity-linked credits and the fixed-income-linked credits. Depending on the current and expected levels of the equity index, the amount to be credited at the end of the term will vary, and so its present value (and hence the interest rate exposures of the product) will also vary.

If the product is externally-indexed then the current yield curve and interest volatilities will also affect the expected amount of interest to be credited to the policy, which in turn affects equity exposures because of the offset between the externally-indexed index credit component and the equity-indexed index credit component.

Simple Pricing Example

Pricing for this product is done at the time of issue and encompasses setting the equity-linked and fixed-income-linked notional allocations of principal, and then setting the crediting component parameters for each of the notional allocations. For the equity-linked notional allocation, this involves setting the participation rate (which will often be set at 100% for ease of marketing and explaining the product), and for the fixed-income-linked notional allocation this involves setting the base rate, the upward and downward participation rates, and the cap and floor rates.

The following pricing example assumes a 7-year term for the product and that:

The 7-year Treasury Rate is constant at 3.93%;

The 7-year spread over Treasuries (i.e., the yield that an issuer can obtain by investing in bonds and mortgages rather than Treasuries) is constant at 1.68%;

The 7-year earned rate for the issuer (the Treasury yield plus the spread) is therefore 5.61%;

The percentage of principal guaranteed to be paid at the end of the term is 100%;

The equity-linked notional allocation has a participation rate of 100%, and there is no averaging period at the end of the term;

Options are priced using the NA-GARCH pricing model (a generalization of the well-known Black-Scholes formula) with an initial equity index volatility of 25%;

The notional allocation of principal is 50% to each of the equity-linked allocation and the fixed-income-linked allocation; and The expense factor (the assumed deduction from the earned rate to cover issuer expenses and profits) is 1.37%.

Given these assumptions, one simple strategy to hedge the return guaranteed to the purchaser is to buy an in-the-money equity-indexed call option with some of the amount deposited and a 7-year zero-coupon bond with the rest. The problem is how much to invest in each of these investments to hedge the return properly. We approach this by examining the index credit component for the fixed-income-linked notional allocation, first under the assumption that it is offered in isolation from the equity-linked notional allocation, and then allowing for the interaction between the index credit components.

Stand-Alone Fixed-Income-Linked Crediting Rate

The notional fixed-income-linked allocation is 50% of principal. Since the overall product guarantee is 100% of principal, the "annual excess guarantee cost" is 0%. If more than 100% of principal were guaranteed at the end of the term, this "annual excess guarantee cost" would be greater than zero.

The issuer could therefore afford to credit the following on the notional fixed-income-linked allocation, if it were stand-alone rather than combined with the equity-linked notional allocation:

Earned Rate—expense factor—annual excess guarantee cost; or 5.61%-1.37%-0%;

or 4.24% at the end of each year.

Discounted at 5.61% (the earned rate), the present value of 4.24% at the end of each year is 0.240009427.

Combined Fixed-Income-Linked Crediting Rate

We can solve (by bisection, regula falsi, Brent's method, or other root-finding method), that a rate of 4.828% can be credited on the fixed-income-linked notional allocation, i.e., almost 60 bp higher than the stand-alone case.

This is demonstrated by the following calculations:

At the end of the term, the value of the fixed-income-linked notional allocation will grow to 50%× $1.04828^7$, or 0.6955, times the initial deposit.

The end-of-term guarantee is 100% of principal. If the value of the equity-linked notional allocation falls from 50% of principal to 30.45% of principal at the end of the term, then the index credit will be zero, and the product's value will be precisely that of the principal guarantee. If the value of the equity-linked notional allocation ends above 30.45% of principal, then there will be a positive index credit. So the issuer could buy a call option that pays off if the value of the equity-linked notional allocation at the end of the term is at least equal to 0.3045/0.5000 of its original value. This is equivalent to a strike price of 60.9% of the initial index value.

Now with a strike price of 60.9% of the initial index value and the above assumptions, the cost of the 7-year call option is 47.986% of the amount being hedged.

Since the equity-linked notional allocation is 50% of the deposit, the cost of the equity portion is 47.986% times 0.50, or 23.993% of the deposit.

Since the actual cost (23.993%) equals the available cost (24%) within rounding limits, this confirms that 4.828% is the right interest rate.

Alternate Combined Fixed-Income-Linked Crediting Rate

Another way to see that 4.828% is the right interest rate is to assume a lower rate (say 4.5%) and try to work through the logic above.

At the end of the term, the value of the fixed-income-linked notional allocation will grow to 50%× $1.045^7$, or 68.04%, of the deposit.

The end-of-term guarantee is 100% of principal. If the value of the equity-linked notional allocation falls to 31.96% of the deposit by the end of the term, then the end-of-term guarantee will control, and there will be no index credit. If the value of the equity-linked notional allocation ends above 31.96% of principal, then there will be a positive index credit. The issuer therefore must buy a call option that pays off if the value of the equity-linked notional allocation is at least equal to 0.3196/0.5000 of its original value. This is equivalent to a strike price of 63.92% of the initial index value.

Now with a strike price of 63.92% of the initial index value, and the above assumptions, the cost of the 7-year call option is 46.266% of the amount being hedged.

Since the equity-linked notional allocation is 50% of the deposit, the cost of hedging the equity-linked notional allocation is 46.266% times 50% of the deposit, or 23.133% of the deposit. This is less than the 24.0% we have available to spend.

Therefore, the base rate for the fixed-income-linked notional allocation can exceed 4.5%.

Financial Models Required for Pricing

The example above shows how to price the product assuming constant interest rates and a given starting value for equity index volatility. This is a valid method for producing a quick approximate price and is therefore useful in its own right. However, a slower but more accurate method for pricing the product is also useful because a) equity-index volatility is not constant but instead changes stochastically, b) interest rates vary by term to maturity (this variation by term is usually referred to as the "yield curve"), and c) interest rates are not constant but vary stochastically over time. These issues become particularly acute when the fixed-income-linked index component is tied to an external index rate, but they are important issues for the product, as described above under the heading Risk-Management Issues, regardless of the exact product configuration.

A good introduction to current approaches to financial modeling of equity and interest-rate derivatives is *An Introduction to the Mathematics of Financial Derivatives* by Salih N. Neftci.

Index-Offset Deposit Product—Pricing Method

We price using the NA-GARCH equity option model (see summary of key equations below), allowing for stochastic equity index paths and stochastic equity-index volatility, and the Libor Market Model (see summary of key equations below), allowing for an arbitrary initial yield curve and stochastic interest rates. Note that the well-known Black-Scholes option pricing model can be obtained as a special case of NA-GARCH in which volatility is constant.

The fully-stochastic method for pricing the index-offset deposit product has the following steps:
  a) Generate a set of yield curve scenarios consistent with valuation parameters;
  b) Generate an equity market scenario for each yield curve scenario, consistent with the valuation parameters and the yield curve scenario;
  c) Apply the index crediting parameters to determine a terminal account value for the product product for each scenario;
  d) Apply a market discount factor to the terminal account value for each scenario to produce a discounted terminal account value for each scenario; and
  e) Compute the average of the discounted terminal account values.

A description of the key equations of the NA-GARCH Model and Libor Market Model follows.

The NA-GARCH Model

Model Domain: Equity Indices and Equity Option Prices

Key Characteristics of the Model:
1. The model has risk-neutral and physical settings.
2. Equity index volatility is stochastic and incorporates skew.
3. Market declines are generally associated with increases in volatility.
4. Implied volatilities tend to be a little higher than physical volatilities.
5. Model allows arbitrage-free hedging and pricing of equity options and futures.
6. A discrete time, not SDE (stochastic differential equation), model.

Outline of Mathematical Formulation:
1. Equity index movements and changes in instantaneous volatility are driven by the same normal random variate.
2. Parameters control asymmetry (tendency of volatility to increase as market drops) and long-term mean volatility.

Key Equations:

$$ln(S_{t+1}/S_t) = (r_f - d) + h_t^{1/2} - 1/2 h_t + h_t^{1/2} \epsilon_{t+1}$$

$$h_{t+1} = {}_0 + {}_1 h_t + {}_2 h_t(\epsilon_{t+1} - c)^2$$

What the Variables Mean:

$S_{t+1}$ and $S_t$ are the values of the equity index at successive intervals, $r_f$ is the risk-free yield over an interval, d is the dividend yield on the stocks comprising the equity index over the same interval, is a risk parameter (zero for arbitrage-free pricing), $h_t$ is the instantaneous variance (volatility squared) over the interval, $\epsilon_{t+1}$ is a normal random variate, 0, 1, and 2 are parameters controlling the level and volatility of volatility, and c is a parameter controlling asymmetry (i.e. the degree to which market declines are associated with increases in volatility).

Note: To change from the physical to the risk-neutral setting, set c := c+, then set :=0.

Implementation Notes:
1. Our implementation is mostly Monte Carlo with a number of pre-computations to achieve acceptable speed: analytical approximations are not very useful for this model. Although lattice methods could be used they become difficult to apply for path-dependent options.
2. Parameters can be estimated given an option price, index, interest rate, and dividend history. The values currently used in the implementation were derived from a least-squares fit to S&P 500 listed option price history and physical index history over the period 1984-2001.

The Libor Market Model

Model Domain: Yield Curves and Interest Rate Options.

Key Characteristics of the Model:
1. The model has arbitrage-free and physical settings, depending on whether the market price of risk is set to zero (arbitrage-free) or not (physical).
2. In the arbitrage-free setting, the model can reproduce market prices of bonds and fixed income options.
3. In the physical setting, the model can generate realistic (i.e. simulated historical) bond price scenarios.
4. The yield curve can undergo a variety of realistic non-parallel shifts.
5. The correlation structure of changes in the yield curve can be based on physical volatility data (historical time series) or current market volatility data (e.g. futures option prices).

Outline of Mathematical Formulation:
1. The yield curve can be modeled using different measures (e.g. forward measure, spot Libor measure).
2. We give the forward measure equations since the Hunter-Jäckel-Joshi predictor-corrector method is useful in pricing interest-indexed products.
3. Bond prices divided by the numeraire are martingales.
4. Forward Libor interest rates are assumed to be lognormally distributed.
5. Discrete tenors (zero-coupon bonds maturing integral periods of time from the initial date) are assumed. A quarterly tenor can be used for scenario generation and an annual tenor for interest-indexed product pricing.

6. Natural cubic spline interpolation is used to derive bond prices at other maturities in the scenario generator.

Key Equations (Forward Measure):

$$L_n(t) = (1/l)[B(t,T_n)/B(t,T_{n+1}) - 1]$$

$$dL_{n-1}(t) = L_{n-1}(t)_{n-1}(t).dW_n(t)$$

$$dW_{n+1}(t) = dW_n(t) + {}_n(t)L_n(t)/(1+L_n(t))dt$$

What the Variables Mean:

$B(t,T_n)$ is the price at time t of a bond maturing at time $T_n$, is the common spacing between $T_Q T_{\bar{1}}.T_n$, $L_n(t)$ is a forward Libor rate at time t, $dW_n(t)$ is an increment in d-dimensional Brownian motion at time t, $_{n-1}(t)$ is a d-dimensional vector volatility function, and . is the inner product of two d-dimensional vectors.

Despite the name "Libor Market Model", there is no bar to applying the model to Treasury rates.

Comments on Key Algorithms Used

Singular Value Square-Root Decomposition

The method finds a lower triangular factor L of a symmetric matrix A such that LL'=A, where ' denotes matrix transpose, as described in *Matrix Computations*, Golub and Van Loan, and by Golub and Reinsch. This method is superior in this application to the well-known Choleski square-root decomposition since the matrix need not be of full rank.

Binary Search

A variant of Knuth's Uniform Binary Search, modified for unsuccessful searches and precomputation of array strides, is used to search the sorted cumulative distribution function tables when computing values for path-independent assets. It is obvious that other search methods (linear, Fibonacci, trie, etc.) could be used instead, although performance might suffer.

R1279

This generator is based on the properties of linear feedback shift registers and uses only logical (bitwise exclusive-or) operations and is therefore very fast on binary computers. It also has an extremely long period—approximately $10^{385}$. A linear congruential multiplicative generator could be used instead although performance might suffer and period exhaustion would probably occur.

Ziggurat

This method, developed by Marsaglia and Tsang, generates normal random numbers by decomposing the normal distribution function into a number of rectangles (typically 128 or 256) and a number of small irregularly shaped densities for which a relatively efficient sampling algorithm exists. Requires fewer transcendental function calls on average than the Marsaglia-Bray method.

Predictor-Corrector

The method is used to evolve the yield curve in the Libor Market Model using relatively long time steps, on the order of a year or more, as opposed to the shorter time steps required for the same degree of accuracy using other characterizations of the Libor Market Model, as described in *Drift Approximations in a Forward-Rate-Based LIBOR Market Model*, C. J. Hunter, P. Jäckel, and M. S. Joshi (2001). Our implementation is optimized to minimize the number of calls to transcendental functions by use of Chebyshev and Taylor approximations.

Comments on CPU Instruction Set Usage

The initialization phase of the program is optimized for use on Intel hardware and uses the SIMD instruction set available in Pentium III and later processors to achieve high execution speed.

Significant speedups can be achieved through the interaction of three optimizations:

Use of packed single-precision floating point operations, allowing "ganged" operations on four single-precision floating point values at a time, Forcing of vector lengths to multiples of eight, so that the packed instructions can be unrolled by a factor of two and then scheduled to reduce their latency; and "Strip-mining" to increase the proportion of the time that required values can be found in the L1 and L2 caches when required for calculations rather than having to be fetched from the computer's main random-access memory.

This last optimization is particularly important on present-day computers since increases in processor clock speed have generally outpaced increases in RAM speed.

A comprehensive description of the considerations involved in optimizing programs for the Pentium III processor is contained in the *Intel Architecture Optimization Reference Manual*. Another good reference is *The Software Optimization Cookbook*, by Richard Gerber, from Intel Press.

Comments on Memory Allocation

Memory allocation is done using a customized 16 Mb allocation block format to increase speed, to avoid memory fragmentation, and to ensure proper alignment on 16-byte boundaries of operands for SIMD instructions. Built-in functions such as GetMem and Dispose could be used at some cost in execution time in the non-SIMD case, but additional programming would be required to achieve proper alignment for SIMD instruction operands.

General Comment on Program Packaging

Note that many of the utilities used by the index offset deposit product pricing programs are packaged as DLL's (dynamic link libraries) in this implementation. The DLL's are all written in Delphi, Borland/Inprise's object-oriented Pascal language, and are compiled to machine code to run on a Pentium processor.

DLL's can be called from most computer languages available on 32-bit Windows platforms, so the utilities are usable from both of the main implementation languages for the software, APL and Delphi.

Important functions and procedures of the invention are described as follows:

NAGARCH5.dll—Description

Source File: nagarch5.dpr

The purpose of the program is to allow speedy and efficient valuation of European put and call options and European-exercise binary options and binary option cliquets under the NA-GARCH stochastic equity index volatility model. The techniques used for these options can be adapted to other derivative instruments by one ordinarily skilled in the art. Although indices are referred to throughout, options based on single values rather than an index of values (e.g., on the prices of single securities, such as IBM and Intel common shares, rather than indices based on an aggregate of securities prices, such as the S&P 500 and the Nasdaq 100) can clearly be handled without making any program changes.

NA-GARCH is short for Nonlinear Asymmetric Generalized Autoregressive Conditional Heteroscedasticity. This mathematical model, under slightly different names, was developed independently by Engle & Ng (1993), Kallsen & Taqqu (1994), and Duan (1995). The key equations of the model are listed above.

For many Brownian-motion SDE models, normal variates can be replaced by simpler variates (e.g., binomial or three-point variates) satisfying a moment condition to improve execution speed, as described in, e.g. *Numerical Solution of*

*Stochastic Differential Equations* Peter E. Kloeden and Eckhard Platen, Springer Verlag, 1995. For NA-GARCH, however, the form of the squared term in the expression for the variance makes such substitution impractical, and so a fast accurate method for generating normals is required. The well-known Box-Muller method for example uses transcendental functions and does not give sufficient performance for many applications.

The primary computation method is Monte Carlo simulation under the risk-neutral measure, since there are no known useful analytic approximations to NA-GARCH valuation for options with terms longer than 60-90 days. See, e.g. *An Analytical Approximation for the GARCH option pricing model* by Jin-Chuan Duan, Geneviéve Gauthier, and Jean-Guy Simonato. Option terms on the order of 5-7 years must be handled in order to be practically useful in option valuation, especially for indexed product pricing.

However, a straightforward implementation of Monte Carlo simulation, even using variance reduction techniques such as antithetic sampling and orthogonal variance reduction, is far too slow to be useful in demanding applications such as simulating the performance of a hedging strategy over hundreds of stochastic scenarios, each with hundreds of trading opportunities. A large number of samples is required in order to reduce the random variation in the Monte Carlo simulated option values to an acceptable level, since small arbitrages caused by random variations may otherwise be detected and expoited by the trading strategy being modelled.

The technique adopted is to "hoist" as many computations as possible to the initialization stage of the program and precompute both a large number of NA-GARCH paths and their empirical distribution functions. Hoisting is a well-known technique used in optimizing compilers, as described in, e.g. *Principles of Compiler Design* by Alfred V. Aho and Jeffrey D. Ullman. The evaluation phase then becomes much faster, since in many cases the value of an option can be found by interpolation in the empirical distribution tables.

However, this "hoisting" introduces its own problems with respect to memory usage. The amount of RAM required if all tables were kept RAM-resident might be larger than the physical RAM available, or even larger than the operating system's maximum available address space. A disk-based solution could alleviate this problem and would be quite inexpensive given today's large-capacity hard disks.

A customized disk addressing and least-recently-used (LRU) caching scheme is therefore used to get the maximum use out of available RAM while sacrificing as little speed as possible. LRU cacheing works well in practice because of the concept of "locality of reference"—requests for a value of an instrument for a given set of parameters tend to be followed by requests with a a similar set, i.e., there is a metric under which they are close. Once a particular record is retrieved, then subsequent accesses to the same record will find it in RAM unless it has not been accessed for a long period of time.

The operation of the disk addressing scheme is a little more involved, and is aimed at ensuring that at most one read operation is required to bring a specified part of any empirical distribution table into RAM. The approach is based on organization of files by linear byte addresses (LBA's). Although direct access by cylinder-head addressing (as was once common on IBM mainframes) is not supported by popular PC operating systems such as Windows or Linux, it is still the case that records with linear byte addresses (LBA's) within approximately 100 Kb to 1 Mb of each other will tend to be on the same or contiguous tracks and therefore accessible more quickly than records with widely separated LBA's. This is especially likely to be the case if the disk controller caches the most recent sectors read or performs "read-ahead", i.e. pre-reads sectors on the same track.

The physical layout of the NAGARCH value records to enable the desired performance is as follows:

The file is organized as a B-tree with exactly two levels, organized so that the top level in can fit in available RAM, and so that the leaf nodes are full;

File offsets are made monotonic in disk LBA, either by using a freshly formatted disk or by using a commercially-available disk defragmentation utility; and An appreciable fraction (say one-half) of physical RAM is dedicated to an LRU record cache.

The implications of this layout include:

Access to any value record requires at most one disk read, and

Determining which disk location containes the desired value record to read never itself requires a disk read, i.e. no disk read depends on the result of a previous read.

This last point gives rise to a further optimization opportunity, because it implies that we can reorder a given set of reads arbitrarily: in particular, we can reorder them to be sequenced by LBA, which will minimize disk seek time.

To be more specific, since a read is never required to find the disk address for a subsequent read, the reads required to fulfill a specific value request can occur in any order. In particular, reading by ascending linear byte address is a permissible order.

A substantial improvement (empirically, a factor of four) in disk access speed can therefore be realized by implementing the following four-step approach:

1) Perform the read and interpolation steps required to calculate the option value, but don't actually read the records, just store the record numbers;

2) Sort the record numbers and remove duplicates;

3) Read the records in record-number order into the cache; and

4) Perform the read and interpolation steps once again: this time, the records to be read will be found in the cache, so the time-consuming reading of records at random addresses will not actually occur.

NAGARCH5.dll—Detailed Method of Operation

Two basic datatypes, pairs and triples (TPair and TTriple) are used. Triples are used to value binary options and European options. Pairs are used to compute forward ATM binary option payoff probabilities as part of the computation for binary cliquets.

function cnorm2(const x: double): double;

This function calculates an approximation to the cumulative distribution function for the normal distribution function. This is useful for calculating option values and greeks using the Black-Scholes formula. The approximation is taken from AMS 55, Abramowitz & Stegun.

function cnorm3(const x: double): double;

This function calculates an approximation to the cumulative distribution function for the normal distribution function for a restricted range (−2 to 2), using a precomputed table such that quadratic interpolation gives 6 correct digits and using no transcendental functions.

function cnorm(const x: double): double;

This function just calls cnorm2 or cnorm3, depending on whether x is in the restricted range for cnorm3.

function marG(x: double): double;

This function is used in the Marsaglia-Bray normal random number generator as cited in Ripley.

function marNorm: double;

This function implements the Marsaglia-Bray normal random number generator given in Ripley, which is considerably faster than the Box-Muller method because it uses fewer transcendental calls on average.

procedure r250Init;

This procedure sets up the initial state for our improved version of Kirkpatrick and Stoll's r250 random number generator. Kirkpatrick and Stoll's r250 random number generator is also described in *Inner Loops* by Rick Booth. The speed improvement in our coding of the algorithm comes from using the floating point SIMD registers as 128-bit wide Boolean registers rather than as 4 single-precision floating point numbers. This procedure also sets up a pool of precomputed normal random numbers for later use.

function r250: Carray; register;

Using general purpose regs eax, ecx, edx, and SIMD reg xmm0, returns a pointer to four random cardinals at a time.

procedure r250norm4(nout: Sarray);

Returns four normals into destination array, using r250 to generate indices into precomputed pool of normal random numbers.

procedure r250normsvee(normdest: Sarray; normlen: integer);

Fills in a single-precision normal vector where number of elements is multiple of four by randomly shuffling from a large pre-generated pool of normals.

procedure r250normdvec(normdest: Darray; normlen: integer);

Same as r250normsvec but in double precision.

procedure resetNormals;

Reset the random number generator to get reproducible streams of random numbers: using matched sets of random number to drive simulations with perturbed parameters is an important variance reduction technique for computing values and greeks accurately.

procedure rsortTriples(ain: TTripleArray; tin: TTripleArray; n: integer);

A modification of radix sort as given in *Algorithms*, by Robert Sedgewick, specialized for sorting on positive single-precision keys, with the idea of making good use of Pentium cache hierarchy. We take advantage of the knowledge that exactly two passes of radix sort are needed if we use a radix of 65536, and make appropriate adjustments for Intel endian behavior and zero origin. Note that with an L2 cache of 256 Kb, the cache is exactly big enough for the count array; also note that the input array is accessed sequentially. This version sorts data of type TTriple.

procedure rsortPairs(ain: TPairArray; tin: TPairArray; n: integer);

Same as rsortTriples, but sorts data of type TPair.

procedure binaryInit(n: cardinal; stride: cardinal; bdeltas: Carray);

Initialization procedure for Knuth's Algorithm C, Uniform Binary Search. We pull array strides into the binary search deltas (increments) by pre-multiplying: this improves search speed because integer multiplies are relatively slow on Pentium machines.

Procedure lowLevelBinarySearch(a0: pointer; key: single; bdeltas: Carray; var res: pointer);

This is Knuth's algorithm C, generalized to sort variable-length records. The first 4 bytes of each record must be a single-precision floating point number and is treated as the key to be compared against.

procedure writeRec;

Writes the current work record, based on the record number embedded in the record, the known recordsize, and the known physical file size. To deal with the maximum physical file size limit of 4 Gb-2 bytes in FAT32 file systems (as used with for example Windows 98), one logical file for the program will in general correspond to multiple physical files.

procedure writePairsViaCache(pairsIn: TPairArray; npairs: integer; volind: integer; rowind: integer; cacheBase: pointer);

Create records from arrays of type TPair, write the records, and keep cache entries up to date. The array data is supplemented with high and low sentinel values and is "stuttered" (the last element of each record is duplicated as the first element of next record) to make searching and interpolation as easy as possible and to ensure that at most one record need be read to calculate an option value. The cache entry for a record contains a copy of the highest key in the output record (actual key, not sentinel) and the record number.

procedure writeTriplesViaCache(triplesIn: TTripleArray; ntriples: integer; volind: integer; rowind: integer; cacheBase: pointer);

This is the same as writePairsViaCache but for TTriple.

procedure NaGarchRiskNeutralPathGen(sd0, r: single; obsPerYear, obsToGen, saveEvery: integer; shortObs, shortSaveEvery: integer; beta0, beta1, beta2, c: single; nscengen, nscenkeep, ivol: integer; var shortTermMoments: TMoment Array);

This routine generates a large number of risk-neutral NA-GARCH scenarios given starting values for the stock index and instantaneous volatility and assumed NA-GARCH parameters. The scenario generation is lock-stepped together (i.e. values are generated for say 5,000,000 scenarios at t=0.01, and then for the same 5,000,000 scenarios at t=0.02) to make it easy to contruct empirical distribution functions and sort them. A large number of scenarios is needed in order to reduce spurious arbitrages due to random noise.

Lambda (the market price of risk) is set to zero because only risk-neutral scenarios are relevant for option pricing.

Short-term (less than approximately one year) and long-term (longer than short-term) values are saved to allow for easier interpolation in the option valuation phase. Pseudocode for the routine is as follows:

For long-time-scale saves and short-time-scale saves do
    make empirical distribution function
    if time <> 0 then radix sort triples representing empirical
       distribution function
    Thin the set of triples to store on disk (typically 5,000,000
       down to 50,000)
    Store empirical cdf of ratio of indices for one-year moves
       for forward binary probabilities
    For short term saves also
    Get mean and std deviation of log returns, and
    skewness and kurtosis of standardized log return,
    and save them
end
Generate next time step for all of the scenarios
end;

procedure nagarchScenarioGen(dbFileName: string; tmax: single; siglo, sighi: single; nsig: integer; c, lambda, beta0, beta1, beta2: single; ndaysperyear, nscengen, nscenkeep: integer; force: integer);

This routine calls NaGarchRiskNeutralPathGen repeatedly to generate NA-GARCH scenarios for an assumed interest rate of zero and a grid of initial volatilities. The first key step is to determine a record size that is an integral number of sectors (for efficient I/O handling under Windows) and that will allow for an exactly two-level B-tree, with our modifications (sentinels, stuttering) to ensure that the option valuation phase will require the minimum possible number of disk reads. Another key step is to set up the memory-mapped cache directory area.

procedure lowLevelReadRecord(rp: PCacheRec; rno: integer);

This procedure takes a record number and returns a record without going through the LRU cache. It is used as the low-level interface to the operating system's disk read routines.

procedure openForRead(fname: PChar);

This procedure sets some globals that readRecord and its utilities depend on. Aside from file handles, these are:

1) The LRU cache. Note that all cached records are (have been constructed to be) the same length.

2) The binary search deltas. These are set up for just-in-time (on-demand) initialization, since this is easier than keeping track of every possible length that might be required during the initialization phase.

3) The default read mode and the read queue. The default read mode is set to actually request records from disk immediately (unless they're already in the LRU cache) but this is overridden in the nagarch_vv_* routines below.

procedure binarySearch(a0: pointer; n: integer; stride: integer; key: single; var res: pointer);

Does just-in-time initialization of binary search deltas referred to above if necessary and then calls lowLevelBinarySearch.

function readRecordIntoCache(pce: PCacheEnt): PCacheRec;

This routine reads a record into the LRU cache, discarding the least-recently used record if the cache is full. There is a little bit of redundancy in the cacheing scheme, but this doesn't matter because all records are read-only after initialization, so the possibility of having an extra copy in memory does not raise coherency issues.

function lookup(key: single; volind: integer; rowind: integer; cacheBase: pointer): pointer;

This function looks up the pair or triple that goes with a key, doing at most one disk read. The method is to first do a search in RAM (first-level records) to find the appropriate cache entry. Then, depending on the current value of readMode, either search for a leaf record in LRU cache (this may do one disk read), OR store a pointer to the cache entry that we would have liked to have read: doQueuedReads will do this later in a seek-time-reducing order.

procedure valCallOnPathPi(volind: integer; rowind: integer; cacheBase: Pointer; r, divi, e, t: single; var pay: single; var payd: single; var payr: single);

This routine values a European call depending on the fact that the payoff is path-independent, i.e. using binary search lookup into the empirical distribution functions. The routine interpolates on volatility and time to expiry, and returns the option payoff, the payoff with the stock index increased slightly, and the payoff with the interest rate increased slightly. The second and third payoff values are used in an interpolation scheme by the caller to find the delta and rho of the option.

function valUltraShortTermCallBasic(s, e, t, r, divi: single; isig: integer): single;

This routine uses an abbreviated varsion of the analytic approximation for valuing options under NA-GARCH (Duan-Gauthier-Simonato formula) to get value only. This is useful only for options with a very short period of time to expiry. The formula is taken from *An Analytical Approximation for the GARCH option pricing model* by Duan, Gauthier, and Simonato: see the original paper for details and the full formula.

procedure valUltraShortTermCall(s, e, t, r, divi: single; isig: integer; var pay: single; var payd: single; var payr: single);

This routine gets the payoffs for the basic call option value, and bumped values for use in approximating delta and rho using valUltraShortTermCallBasic.

procedure valShortTermCall(s, e, t, r, divi: single; isig: integer; var pay: single; var payd: single; var payr: single);

This routine uses binary search (possibly going out to disk for values not found in LRU cache) on short-term triples, and interpolates the results, to get the basic call option value, and bumped values for use in approximating delta and rho, for a short-term call option. It uses valCallOnPathPi as a subroutine.

procedure valLongTermCall(s, e, t, r, divi: single; isig: integer; var pay: single; var payd: single; var payr: single);

The same as valShortTermCall, but works on long-term triples. It also uses valCallOnPathPi as a subroutine.

procedure nagarchValueCall(s, e, t, r, divi: single; isig: integer; var pay: single; var payd: single; var payr: single);

This routine just decides which lower-level function to use to value a call option depending on the remaining time to expiry. The code is straightforward:

if t<=0.02 then begin
valUltraShortTermCall(s, e, t, r, divi, isig, pay, payd, payr);
end
else if t<=1.06 then begin
valShortTermCall(s, e, t, r, divi, isig, pay, payd, payr);
end
else begin
valLongTermCall(s, e, t, r, divi, isig, pay, payd, payr);
end;

procedure nagarchValuePut(s, e, t, r, divi: single; isig: integer; var pay: single; var payd: single; var payr: single);

This routine uses put-call parity (which holds under NA-GARCH assumptions just as it does under Black-Scholes assumptions) to get basic and bumped values for a put option from the corresponding values for a call option.

procedure valBinaryCallOnPathPi(volind: integer; rowind: integer; cacheBase: Pointer; r, divi, e, t: single; var pay: single; var payd: single; var payr: single);

This routine values a binary call depending on the fact that the payoff is path-independent, i.e. using binary search lookup into the empirical distribution functions and reading from disk if required values are not found in the LRU cache. It interpolates on volatility and time to expiry, and returns the expected option payoff, the expected option payoff with the stock index increased slightly, and the option payoff with the interest rate increased slightly. The second and third payoff items are used in an interpolation scheme by the caller to find the delta and rho of the option.

procedure valShortTermBinaryCall(s, e, t, r, divi: single; isig: integer; var pay: single; var payd: single; var payr: single);

This routine uses binary search (possibly going out to disk for values not found in LRU cache) on short-term triples, and interpolates the results, to get the basic call option value, and bumped values for use in approximating delta and rho, for a short-term binary call option. It uses valBinaryCallOnPathPi as a subroutine.

procedure valLongTermBinaryCall(s, e, t, r, divi: single; isig: integer; var pay: single; var payd: single; var payr: single);

This routine uses binary search (possibly going out to disk for values not found in LRU cache) on long-term triples, and interpolates the results, to get the basic call option value, and bumped values for use in approximating delta and rho, for a short-term binary call option. It also uses valBinaryCallOnPathPi as a subroutine.

procedure nagarchValueBinaryCall(s, e, t, r, divi: single; isig: integer; var pay: single; var payd: single; var payr: single);

This routine just decides which of valShortTermBinaryCall and valLongTermBinaryCall to invoke, and is very similar in structure to procedure nagarchValueCall described above.

procedure binaryCallForwardProbOnPathPi(volind: integer; rowind: integer; cacheBase: Pointer; r, divi, e: single; var prob: single; var probd: single; var probr: single);

This routine gets one-year forward probabilities that the equity index will increase or stay level, corresponding to the payoff of an ATM binary call.

function valueBinCliquet(base, sr: single; probs, disc: Sarray; nper: integer): single;

This routine values a binary cliquet, given assumed probabilities that index stays same or increases in each future year. In detail, it values a compounding binary cliquet that pays out participation at the specified rate annually.

procedure nagarchValueBinaryCliquet(base, sr, s, e, t, r, divi: single; isig: integer; var pay: single; var payd: single; var payr: single);

This routine values a binary cliquet using binary search. It uses the fact that "only two things can happen each year", (i.e. a binary option pays off or it doesn't) and invokes subroutines binaryCallForwardProbOnPathPi and valueBinCliquet.

procedure closeForRead;

This procedures closes operating system file handles and frees RAM procedure heapsort(ain: PCacheEntVec; m: integer);

This is a specialized version of heapsort which sorts pointers to cache entries in order of the record number in the cache entry to which they point.

procedure doQueuedReads;

This procedure performs previously queued reads in a seek-time-reducing order. The method is to heapsort pointers to cache entries by record number. Then the reads are done, while updating the cache entries and filling the LRU cache. This method works because the sequence of disk reads does not depend on the contents of the disk reads, given our two-level B-tree approach, so the reads can be reordered as desired. If we reorder them into approximate LBA (linear byte address) order before reading from disk, then we reduce both seek time and rotational latency without introducing dependence on the detailed disk geometry. A description of a similar idea in the mainframe context, in which the operating system supported direct cylinder-head addressing of the disk, is found in *File Structures: An Analytic Approach*, by Betty Joan Salzberg.

The following routines with the stdcall attribute are ones intended to be directly callable by the user. They are exported from the DLL.

procedure nagarch_init(dbFileName: PChar; tmax: double; siglo, sighi: double; nsig: integer; c, lambda, beta0, beta1, beta2: double; n, nscengen, nscenkeep, seedVal: integer; force: integer); stdcall;

This routine creates the disk files corresponding to a given set of NA-GARCH parameters, a random seed value, the requested number of scenarios to generate and to keep after thinning out, and the requested volatility grid. These disk files are used (implicitly or explicitly) by all the valuation functions.

procedure nagarch_open(dbFileName: PChar); stdcall;

Calls openForRead as defined above.

procedure nagarch_value_call(s, e, t, r, divi, sig: double; var val: double; var del: double; var rho: double; var veg: double); stdcall;

This routine invokes nagarchValueCall for three adjacent volatilities in the grid and quadratically interpolates the results, then computes delta, rho, and vega for the call from the basic value and the bumped values.

procedure nagarch_value_put(s, e, t, r, divi, sig: double; var val: double; var del: double; var rho: double; var veg: double); stdcall;

This routine uses put-call parity explicitly with interpolated call value to calculate a put value.

procedure nagarch_value_binary_call(s, e, t, r, divi, sig: double; var val: double; var del: double; var rho: double; var veg: double); stdcall;

This routine invokes nagarchValueBinaryCall for two adjacent volatilities and interpolates, then computes delta, rho, and vega for the binary call.

procedure nagarch_value_binary_cliquet(base, sr, s, e, t, r, divi, sig: double; var val: double; var del: double; var rho: double; var veg: double); stdcall;

This routine invokes nagarchValueBinaryCliquet for two adjacent volatilities and interpolates, then computes delta, rho, and vega for the binary cliquet.

procedure nagarch_vv_call(s, e, t, r, divi, sig: Darray; val, del, rho, veg: Darray; n: integer); stdcall;

This is a vectorized routine which is faster than repeatedly invoking nagarch_value_call (optimized disk access) in the important special case in which many call values are required at the same time. The method uses the global readMode to control whether records are being read into the cache.

First, we calculate and discard dummy (unusable) values for the call options in order to establish which disk accesses nagarch_value_call will perform. Second, we invoke doQueuedReads, which fills the LRU cache with the required records using a seek-time-reducing order. Finally, we go through the nagarch_value_call sequence again: since the required records are found in the LRU cache this time around, usable values are obtained.

procedure nagarch_vv_put(s, e, t, r, divi, sig: Darray; val, del, rho, veg: Darray; n: integer); stdcall;

This routine uses the same method as nagarch_vv_call to perform vectorized valuation of puts.

procedure nagarch_vv_binary_call(s, e, t, r, divi, sig: Darray; val, del, rho, veg: Darray; n: integer); stdcall;

This routine uses the same method as nagarch_vv_call to perform vectorized valuation of binary calls.

procedure nagarch_vv_binary_cliquet(base, sr: Darray; s, e, t, r, divi, sig: Darray; val, del, rho, veg: Darray; n: integer); stdcall;

This routine uses the same method as nagarch_vv_call to perform vectorized valuation of binary cliquets.

The initialization for NAGARCH5 is straightforward, comprising initializing the random number generator and the permanent and temporary RAM allocators.

svd2.dll—Description

Source File: svd2.dpr

This DLL implements Golub and Reinsch's algorithm for Singular Value Decomposition of a matrix for use from APL. Our implementation handles only the case where the input m by n matrix has m>=n: this is sufficient for our application.

Sobjk2.dll—Description

Source File: sobjk2.dpr

This DLL implements the Sobol' quasi-random sequence using the Joe and Kuo extension to Bratley and Fox's Sobol' sequence generator. A Fortran program implementing the has been published as TOMS (Transactions on Mathematical Software) Algorithm 659.

Our implementation is in Delphi and makes use of intrinsic Boolean operators that are not part of standard Fortran to achieve faster execution speed. A key feature of our implementation is that it implements the concept of handles to streams of vectors of quasi-random numbers, so that multiple sequences can be generated in an interleaved, rather than sequential, manner. This is useful in yield curve generation, for example.

A good description of the use of quasi-random sequences for numerical integration, and a comparison with straightforward Monte Carlo integration, is given in Numerical Recipes in C.

Index-Offset Deposit Product Pricing Program—General Description

Source File: cpp2p.pas

Since indexed interest for this product is both fixed-income-linked and equity-index-linked, the product raises unusual modelling challenges. Both realistic and arbitrage-free equity market behavior (including stochastic volatility) and realistic and arbitrage-free interest rate modelling (including nonparallel shifts in the yield curve) are required to price the product.

One approach to combining stochastic equity indices with stochastic volatility and stochastic interest rates on an arbitrage-free basis would be to use the NA-GARCH stochastic equity model with a popular stochastic short-rate model, such as the Cox-Ingersoll-Ross (CIR) interest rate model. This would be a realistic approach if applied to modelling financial instruments that depended only on stochastic equity behavior and fairly short-term interest rates. It would be hard to apply to the index-offset deposit product, however, since fitting the initial yield curve and allowing for nonparallel yield curve shifts are important, and neither of these are easy to do with CIR.

The conceptually simplest approach to modelling the index-offset deposit product that captures realistic yield curve behavior is to use NA-GARCH together with a spot Libor measure implementation of the Libor Market Model. The spot Libor measure, introduced by Jamshidian, is the closest analog in the Libor Market Model setting to the risk-neutral measure often used for equity derivative pricing. It has the characteristics of a bank-account numeraire, and fits well with NA-GARCH's relatively short steps (e.g. 100 steps per year).

However, this is a computation-intensive approach for two reasons: NA-GARCH has to take many relatively short steps, so the evolving yield curve has to be simulated using many short steps, and even with a typical Libor Market model tenor spacing of ¼ year, many zero-coupon bond (hereafter simply bond) maturities must be simulated and an interpolation process (typically splines) used to get the resulting short rates to drive NA-GARCH.

NA-GARCH can also be used with a forward measure implementation of a Libor Market Model using a predictor-corrector method (as given, e.g., in *Drift Approximations in a Forward-Rate-Based LIBOR Market Model*, by Hunter, Jäckel, and Joshi) to price the index-offset deposit product, although the reasoning required to connect them correctly is more involved.

As described above, the NA-GARCH model for evolution of the stock index assumes that the following equation holds:

$$ln(S_{t+1}/S_t) = (r_f - d) + h_t^{1/2} - 1/2 h_t + h_t^{1/2} \epsilon_{t+1}$$

This equation can clearly be transformed to the equivalent $$S_{t-1} = S_t * \exp(r_f - d) * \exp(h_t^{1/2} - 1/2 h_t + h_t^{1/2} \epsilon_{t-1}),$$

in which the interest rate term and noise terms have been separated. By induction we can write:

$$S_T = S_0 * \exp((r-d)*T) * \Pi \exp(h_t^{1/2} - 1/2 h_t + h_t^{1/2} \epsilon_{t+1}), \text{ or}$$

$$S_T = S_0 * \exp(r*T) * \exp(-d*T) * \Pi \exp(h_t^{1/2} - 1/2 h_t + h_t^{1/2} \epsilon_{t+1})$$

where r and d are now continuously compounded rates, T is the terminal date, and all the random variation is contained in the product (Π) terms. We refer to exp(r*T) as an "accumulation factor" below.

To calculate an option price, a discount factor must be used to calculate the discounted expectation of the excess of the terminal stock index $S_T$ over the strike price. In the constant interest rate case the discount factor is just the reciprocal of the accumulation factor, i.e. exp(−r*T), but as described below there it is sometimes useful to allow them to be different.

We refer to the ability to separate the accumulation factor from the random variation term as the "factoring property" of NA-GARCH. Practically it has three very important implications for the index-offset deposit product pricing program:

1) For use in Monte Carlo simulations in which interest rates vary, one set of NA-GARCH stock index scenarios can be precalculated assuming an interest rate of zero. This set can then be adjusted to be consistent with any desired interest rate simply by multiplying by the correct exp(r*T) term;
2) Similarly, for use in Monte Carlo simulations in which computation of sensitivities to changes in interest rates is desired, for instance in selecting and testing the appropriate fixed-income investment strategy for the product, one set of NA-GARCH stock index scenarios can be precalculated assuming an interest rate of zero. This set can then be adjusted to be consistent with any set of perturbed yield curves by making a multiplicative adjustment; and
3) It is possible to apply different accumulation and discount factors without recomputing the stock index paths, and this is crucial in the application of forward measure models, as described next.

Terminal measure, which is defined as forward measure in which the numeraire is the longest-term bond in the model, is convenient for discounting in this case. In a forward measure model the discount factor for a European option is always the price of a zero-coupon bond maturing when the option expires, allowing considerable simplification. It does not follow from this that the accumulation factor is just the reciprocal of the zero-coupon bond price, however: although the integrated short rate is not used directly for discounting, the Libor market model analog to the integrated short rate (the spot Libor process) is used to generate the stock index paths.

For example, with a forward measure predictor-corrector model, for a product with a five-year term and annual indexing to the 5-year zero-coupon Treasury, only five annual steps must be taken to get to the end of the product term with a set of simulated Treasury-indexed index credit components. The longest bond required to complete the simulation is one with a ten-year maturity at the time of product issue (i.e. reducing to five-year by product maturity).

This leaves the problem of how to generate a consistent set of equity-indexed index credit components. Approximate equity index scenario values at the end of the product term can be computed by multiplying a) an approximate accumulation factor equal to the reciprocal of the 5-year zero-coupon bond price at issue by b) a set of NA-GARCH equity index scenario values computed with an interest rate of zero, i.e. with the interest rate dependence factored out.

This approach only provides an approximation to truly arbitrage-free equity index scenarios in the stochastic interest rate case, however. This is easy to see because in the limiting case if we worked in the five year forward measure, equity index scenario paths would be driven by only one source of noise (NA-GARCH index volatility) in the forward-measure model, while they would be driven by two (interest rate accumulation factor and NA-GARCH index volatility) in the spot Libor measure. This suggests that using the spot Libor process to generate the equity index paths (with the spot Libor process generated using the forward measure) would give the exact result.

In fact, Theorem 2 of Geman, El Karoui, and Rochet gives the price of a European equity option call option at time 0 (C(0)) with strike K expiring at time T as:

$$C(0)=B(0,T)E^T[(S(T)-K)^+]$$

where we have modified the notation slightly from the original paper for clarity. The price today of a zero-coupon bond maturing T years from now is B(0,T), and $E^T$ denotes expectation under the T-forward measure, i.e. using the zero-coupon bond maturing at time T as the numeraire. Since the expectation of a function of S(T) is to be taken under the T-forward measure, the terminal stock-index itself S(T) must be generated under the same measure. This is most easily done in a simulation model by generating the terminal values of the spot Libor process under the T-forward measure.

We can extend this reasoning to the index-offset deposit product, which has both equity-linked and fixed-income-linked index credit components, although it is more convenient to perform the simulation in a different numeraire based on the sum of the length of the product term and the term of the longest bond to which credits are indexed. For example, for a five-year product indexed to a five-year bond, and to an equity index as well, it is convenient to perform the simulation using the ten-year bond as numeraire. The spot Libor process is simulated only to year five, since the behavior of the stock index after the end of the product term is irrelevant.

The two index credit components (fixed-income-linked and equity-linked) can then be calculated and combined in accordance with the product's crediting formula to determine the scenario-specific nonnegative index credit at the end of the term. Following Musiela & Rutkowski's equation (13.36), this scenario-specific index credit is accumulated to the terminal date (in this example ten years from product issue) using the then-current 5-year zero-coupon bond price. The discounted value of the index credit for the scenario can then be found by multiplying this accumulated amount by the ten-year zero coupon bond price at issue.

The price of the index credit is then determined by averaging these discounted values over a number of scenarios. We typically run 50,000 scenarios in the Delphi implementation, but the precise number will depend on the accuracy required and the run-time available.

Index Offset Deposit Product Pricing Programs—Detailed Description and Method of Operation Different implementations have been provided to enable different product configurations and to show how to handle both constant and stochastically varying interest rates, how different integration methods can be used, how averaging of ending values of the equity index can be incorporated as well as a point-to-point (European) payoff structure, and to show how different types of externally indexed interest rates, such as Constant Maturity Treasury rates and zero-coupon bond yields can be incorporated into the product.

Constant Interest Rates—APL
Source File: find_cpp.pdf

These functions are written in APL, a vector interpretive computer language often used by actuaries and engineers. Interfaces to the DLL's described above are provided to make them available in APL, since some algorithms are more conveniently expressed (or have better performance) in a compiled language.

Function: C_discrete_asian_mv

This function calculates the price of a discrete averaging option under Black-Scholes assumptions using Curran's approximation. The parameters to the function are as follows:
S_past is the vector of past (known) stock index values in the averaging formula,
S is the current stock index (usually the last value of S_past unless the averaging points do not coincide with freq,
X is the call option strike,
r is the continuously compounded risk-free interest rate for a term equal to the time to option expiry,
div is the continuously compounded dividend yield on the index,
T is the time until expiry of the option,
t1 is the time of the next averaging point (the first averaging point if the option is not yet in averaging period),
dt is the time between averaging points,
n is the number of points in the average, and
vol is the implied volatility of the stock index
Note: The value of a one-year point-to-point (European) option can be obtained as the special case in which no averaging occurs, by calling C_discrete_asian_mv (0/0) S X r 1 1 0 1 vol Function: C_partrates_10

This function implements the pricing method described under the heading "Simple Pricing Example", which involves setting the equity-linked and fixed-income-linked notional allocations of principal, and then setting the crediting component parameters for each of the notional allocations. For the equity-linked notional allocation, this involves setting the participation rate (which will often be set at 100% for ease of marketing and explaining the product), and for the fixed-income-linked notional allocation this involves setting the base rate. The function returns the difference between the amount available to spend on index credits (based on the issuer's chosen expense factor and guarantee cost parameters) and the cost of the hedging equity option. This function can therefore be used to find the base rate through an iterative root-finding process such as Brent's method.

Function: C_value_vacation

This function returns an approximation to the value of an option with an averaging period at the end (often referred to as end-Asian) using the following method:
1) Find the cost of a European option using NA-GARCH;
2) Find the implied volatility X to substitute in the Black-Scholes option-pricing formula to that reproduce the option cost from step 1, and
3) Use Curran's approximation and the implied volatility from step 2 to find the cost of the end-Asian option.

A typical application is valuing a seven-year call option in which the payoff depends on the average of weekly index values over the last quarter of a year rather than just on the ending value, making the payoff less vulnerable to a sudden drop in the index. This approximation has been tested against a more accurate Monte Carlo simulation method using a large number of scenarios and has been found to produce results that are sufficiently accurate for pricing purposes.

Function: U_bs_call

This function implements the well-known Black-Scholes formula for the price of a call option.

Function: U_curran_approx

This function uses Curran's approximation to find the price of a call option with discrete averaging under Black-Scholes assumptions. The formula is taken from Espen Gaarder Haug's The complete guide to option pricing formulas.

Function: U_modbrent_spread_load

This function uses a modified version of Brent's method for finding zeros of a function, together with the function C_partrates_10, to find the base rate that is consistent with the pricing parameters specified by the issuer.

Function: U_modbrent_vol

This function uses a modified version of Brent's method for finding zeros of a function, together with the function U_bs_call, to find the implied volatility that reproduces the call option cost specified by the user.

Function: U_normf

Given a vector of sample values, and a specified mean and standard deviation, returns the values of the cumulative normal distribution at the points of the sample. Uses an approximation for the cumulative distribution function of the standard normal distribution given by Abramowitz and Stegun in AMS55.

Function: find_declared

This function returns the base rate and strike price of the equity option solved for by U_modbrent_spread_load. The user specifies parameters for the initialization of the NA-GARCH dll (these parameters are described in detail below under the description of function nagarch_init) and the name of the NAGARCH 2-level B-tree file. If the file has already been initialized with the same parameters, the initialization call detects this and returns immediately. The NAGARCH file is then opened for use in option valuation.

The user specifies the averaging period at the end of the option term (e.g. 0.25 years), the number of points in the average (e.g. 14 if weekly averaging over the last quarter-year of the product term is desired), the proportion of principal guaranteed to be paid at the end of the term, which may be more than 100% (e.g. 1.016209931=0.9*1.0175^7 if there is a legal or marketing requirement that at least a 1.75% return on 90% of the deposit be guaranteed over a seven-year term), and the equity participation rate (often 1, i.e. 100%, for ease in marketing and explaining the product). The user also specifies the continuously-compounded risk-free interest rate over the product term (e.g. 2.94%), the earned rate available to the issuer over the term (e.g. 4.3%), and the term itself (e.g. 7 years). The user also specifies the expense factor required to recoup the issuer's expenses and required return on investment over the term (e.g. 1.03%), the current dividend yield on the index (e.g. 1.5%), the implied volatility of the index (e.g. 1.5%), and the proportion of the deposit to be notionally allocated to the fixed-income-linked allocation (e.g. 50%).

The function U_modbrent_spread_load is then used to find the base rate and option strike price, which are displayed to the user, and the NAGARCH file is closed.

Function: nagarch_close

This function closes the NA-GARCH dll and associated files, so that the memory allocated by the DLL can be released to the operating system.

Function: nagarch_close_dll

This function is created by nagarch close as interface between APL and the NAGARCH5 dll.

Function: nagarch_init

This function initializes the NA-GARCH dll for option valuation.

The parameters required to be specified are:
fn file name, full-path, no extension, directories should already exist
tmax maximum option term, e.g. 6—should be an integer
lowVol lowest vol to support, e.g. 0.1
highVol highest vol to support, e.g. 0.5
nvols number of vols, e.g. 10
c NA-GARCH asymmetry parameter, e.g. 1.1626318
lambda NA-GARCH price of risk, e.g. 0.050674
beta0 NA-GARCH $_0$, e.g. $2.155870*10^{-6}$
beta1 NA-GARCH $_1$, e.g. 0.899101
beta2 NA-GARCH $_2$, e.g. 0.0375993
n NA-GARCH observations per year, e.g. 253
nscengen number of Monte Carlo scenarios to generate, e.g. 5000000
nscenkeep number of Monte Carlo scenarios to keep after thinning, e.g. 50000
seedVal initial random seed for normal generation—positive integer, not zero
force 0 for no, 1 for yes, force file rewrite even if already initialized with same parameters Function: nagarch_open This function opens the NA-GARCH dll and file. The only parameter is fname, a file name with drive and path but no extension, e.g. 'j:\na'. Extensions are automatically assigned by the NA-GARCH dll.

Function: nagarch_open_dll

This function is created by nagarch_open as interface between APL and the NAGARCH5 dll.

Function: nagarch_value_call

This function values a European call in the NA-GARCH model.

The parameters required to be specified are:
s current value of the stock index
e option strike
t remaining time to expiry
r risk-free rate (continuously compounded)
d dividend rate (continuously compounded)
sig instantaneous volatility Function: nagarch_value_call_dll This function is created by nagarch_value_call as interface between APL and the NAGARCH5 dll.

Method of Operation

The program is run as a command line in the APL interpreter. The program is written to run under the APL+Win interpreter marketed by APL2000 (www.apl2000.com) which has a full-screen windowing facility to allow for interactive editing of programs and display of output. As shown in the screen shot (FIG. 6) and the source code listing, the illustrative values in the description of the function find_declared lead to a base rate of 3.37% and an option strike of 77% of the current index value.

Forward Measure—APL—Stochastic Interest Rates

Source File: cpp_patc.pdf

Function: cent

This function creates scaled and centered variables by subtracting the mean of the variables and dividing by the standard deviation of the variables.

Function: corr

This function calculates an n by n correlation matrix for an m by n matrix of input values.

Function: done_sobol

This function closes a handle to a Sobol' stream created using init_sobol, allowing the sobjk2 dll to release the memory used for stream generation back to the operating system.

Function: done_sobol_dll

This function is created by done_sobol to provide an interface between APL and the sobjk2 dll.

Function: gen_t5trail

This function generates a simulated set of 5-year Constant Maturity Treasury rates, using the market convention that Constant Maturity Treasury rates are generated using the formula for Constant Maturity Swap rates, but using Treasury Rates rather than swap rates. See, for example, equations (10)

and (11) of *The Market Price of Credit Risk: An Empirical Analysis of Interest Rate Swap Spreads* by Jun Liu, Francis A. Longstaff, and Ravit E. Mandell.

The underlying zero coupon bond prices are generated using the predictor-corrector method described above. The underlying noise driving the system is multidimensional Brownian motion.

Function: gen_t5trail_latin

This function differs from gen_t5trail only in the noise used to drive the system. Rather than randomly sampling from the yield curve distribution using multidimensional Brownian motion, systematic sampling (latin hypercube sampling) is used instead. Latin hypercube sampling was originally described in *A comparison of three methods for selecting values of input variables in the analysis of output from a computer code*, M. D. McKay, R. J. Beckman, and W. J. Conover, *Technometrics*, 21(2):239-245, (1979).

Function: gen_t5trail_quasi

This function differs from gen_t5trail in the noise used to drive the system. Rather than randomly sampling from the yield curve distribution using multidimensional Brownian motion, a quasi-random (low-discrepancy) sequence is used instead. This particular implementation uses Joe and Kuo's extension of Bratley and Fox's implementation of the Sobol' sequence.

Function: gen_t5trail_strat

This function differs from gen_t5trail in the noise used to drive the system. Rather than randomly sampling from the yield curve distribution using multidimensional Brownian motion, a stratified sample is used instead. Only the first two axes (principal components) are stratified, since the level and slope of the yield curve are the most important drivers of the variation in the sampled cost of the product's index credit between scenarios.

Function: get_annual_gamma

This function calculates the $_{n-1}(t)$ values to be used in the Libor Market Model from a principal component analysis of weekly Treasury yields over a twenty-year span.

Function: get_latin_hyper_norm

This function computes a latin hypercube sample of normal random variates.

Function: get_quasi_norm

This function applies the inverse of the cumulative distribution function of the normal distribution to a set of vectors of randomly-permuted quasi-random numbers from the Sobol' sequence. These values are then used to drive the evolution of the Libor Market Model yield curves. The random permutation is introduced to avoid introducing spurious correlations between temporally-successive yield curve samples.

Function: get_sobol

This function gets the next set of points in a previously initialized Sobol' sequence given arguments npoints, the number of points to get, and sobHandle, a handle to a previously-initialized Sobol' sequence. The points are returned as a matrix.

Function: get_sobol_dll

This function is created by get_sobol as an interface between APL and the sobjk2 dll.

Function: get_sobol_dim

This function returns the dimensionality (i.e. how many numbers specify a point) of a previously initialized Sobol' sequence given the argument sobHandle, a handle to that sequence.

Function: get_sobol_dim_dll

This function is created by get_sobol_dim as an interface between APL and the sobjk2 dll.

Function: get_strat_norm_2

This function generates a normal sample with stratification along the first two dimensions (principal components).

Function: init_sobol

This function initializes a Sobol' sequence. The arguments are the dimensionality of the Sobol' sequence and the maximum number of points that will be generated. The function returns a handle to the initialized sequence.

Function: init_sobol_dll

This function is created by init_sobol as an interface between APL and the sobjk2 dll.

Function: mean

This function calculates the mean of a vector.

Function: nagarch_gen_vec

This function generates a vector of simulated observations in an NA-GARCH model using the equations cited above. Only the terminal values of the stock index and instantaneous volatility are returned: for large sample sizes, this requires much less RAM than returning the entire simulated history.

Function: nagarch_rescale

This function rescales NA-GARCH parameters from one observation frequency to another. This is useful in converting from parameters based on daily market data to a lower frequency more convenient for simulation modelling, e.g. from 253 observations per year to 100.

Function: norm

This function generates normal (pseudo-) random numbers using the Box-Muller method.

Function: permute

This function returns a (pseudo-) random permutation of the input vector using the APL built-in pseudo-random number generator.

Function: std

This function calculates the standard deviation of its argument.

Function: svd2

This function calculates the singular value decomposition of a matrix and returns the left factor, the singular values, and the right factor.

Function: svd2_dll

This function is created by svd2 as an interface between APL and the svd2 dll.

Function: test_cpp_value_1

This function prices the index-offset deposit product using the function gen_t5trail to calculate the fixed-income-linked index credit component and spot libor process, and the functions gen_t5trail and nagarch_gen_vec to calculate the equity-linked index credit component and terminal account value.

Function: test_cpp_value_2

This function prices the index-offset deposit product using the function gen_t5trail_latin to calculate the fixed-income-linked index credit component and spot libor process, and the functions gen_t5trail_latin and nagarch_gen_vec to calculate the equity-linked index credit component and terminal account value.

Function: test_cpp_value_3

This function prices the index-offset deposit product using the function gen_t5trail_strat to calculate the fixed-income-linked index credit component and spot libor process, and the functions gen_t5trail_start and nagarch_gen_vec to calculate the equity-linked index credit component and terminal account value.

Function: test_cpp_value_4

This function prices the index-offset deposit product using the function gen_t5trail_quasi to calculate the fixed-income-linked index credit component and spot libor process, and the functions gen_t5trail_quasi and nagarch_gen_vec to calculate the equity-linked index credit component and terminal account value.

Function: tr2zc_pad

This function interpolates between key Treasury rates specified by the caller to create a complete yield curve, and then transforms the resulting Treasury rates to zero-coupon rates by stripping out assumed annual coupons with an assumed coupon rate specified by the caller.

Function: unormf

This function calculates the cumulative distribution function of the normal distribution. The method used is taken from AMS55, Abramowitz and Stegun.

Function: unormf_inv

This function calculates the inverse of the cumulative distribution function of the normal distribution using unormf and Newton's method.

Method of Operation

Figure 7:
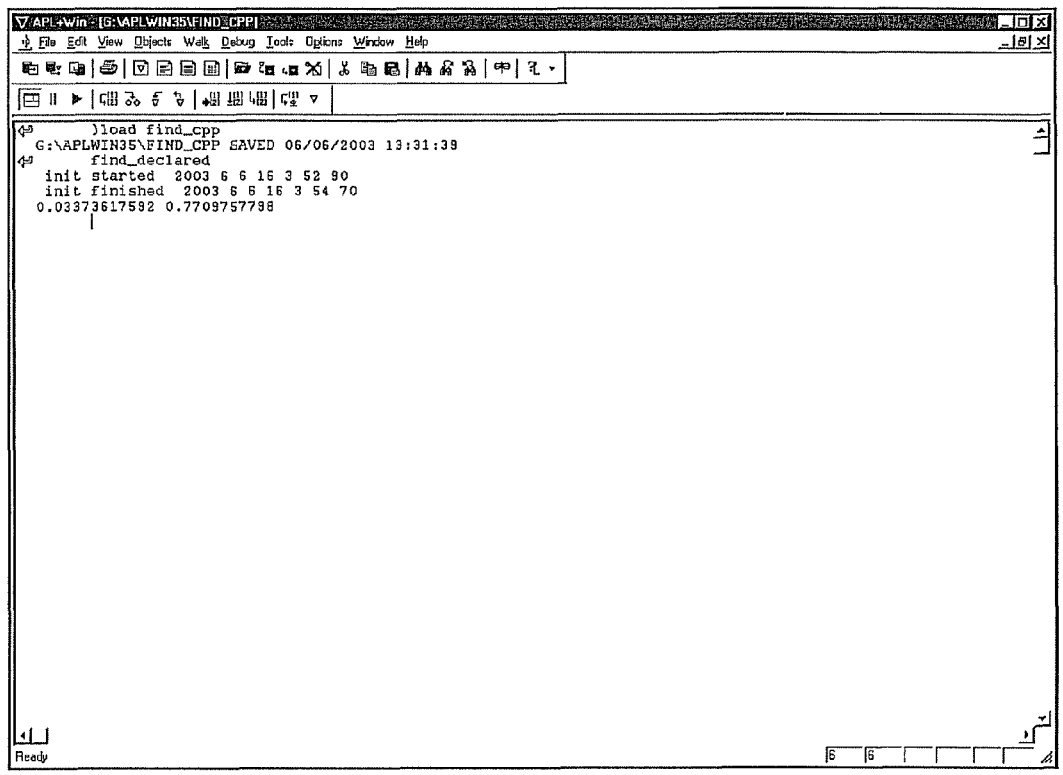

The program is run as a command line in the APL interpreter. The program is written to run under the APL+Win interpreter which has a full-screen windowing facility to allow for interactive editing of programs and display of output. As shown in the screen shot (FIG. 7) and the source code listing, the illustrative values in the function descriptions above lead to calculated prices of the index-offset deposit product of approximately 1.00007, 1.00049, 1.00000, and 1.00027, respectively, using the pseudo-random normal, latin hypercube, stratified sampling, and quasi-random variants of the pricing program.

Forward Measure Implementation—Delphi

The approach is to translate the APL program to Delphi and then make effective use of the SIMD instruction set and the Pentium cache hierarchy. Key factors in achieving efficient execution are:

translation to single precision (APL always uses double precision) to increase speed and reduce the amount of memory traffic "ganging" operations (working with four single-precision floating point numbers at a time) to make efficient use of the parallel SIMD instructions fast random number generation using the R1279 generator and using SIMD floating point registers as 128-bit wide Boolean registers for exclusive-or operations use of the highly efficient Marsaglia-Tsang Ziggurat method (2000 version) for generation of normal random variates strip-mining to make effective use of the L2 (in some cases even L1) cache replacement of transcendental functions with Chebyshev approximations, Taylor approximations, or table lookups forcing array dimensions or number of simulations to multiples of four or eight to facilitate ganging and unrolling (i.e. replicating body of a loop twice inline and then reordering instructions to increase execution speed or decrease latency).

The speedup over the APL version is quite noticeable, approximately a factor of 30.

The current maximum index-offset product term supported is seven years but one skilled in the art could modify easily for longer terms by modifying maxEta and adding more input text boxes and output labels.

Forward Measure Implementation—Delphi—Detailed Method of Operation procedure r1279Init;

This procedure sets up the initial state for a SIMDized version of the r1279 random number generator as described in *Monte Carlo Simulations: Hidden Errors from "Good" Random Number Generators* by Ferrenberg, Wong, Landau, and Wong. It is otherwise similar to r250Init as described above, but without the precomputed normal pool.

function r1279: Carray; register;

Using general purpose regs eax, ecx, edx, and SIMD reg xmm0, returns a pointer to four random cardinals at a time.

procedure resetNormals;

Used to ensure matched random numbers (variance reduction technique) for calculating interest rate exposures (i.e. want to run Monte Carlo scenarios with the same random numbers, differing only in that the initial yield curve is slightly perturbed at different points.

function zigfix(hz: integer; iz: integer): single;

Part of Ziggurat random number generation code. See *The Ziggurat Method for Generating Random Variables* by George Marsaglia and Wai Wan Tsang. Improvements over the version given in their paper include modification to use SIMDized r1279 as well as the jsr generator to get a longer random number generator period and to pick up speed.

procedure zignor4(nout: Sarray);

Gets four single-precision ziggurat normal random numbers, using the fast generation procedure (mask and index) approximately 98% of the time and the slower zigfix procedure about 2% of the time.

procedure zigset;

This procedure sets up the tables used by the ziggurat algorithm.

procedure normsvec(normdest: Sarray; len: integer);

Fills in a vector (length must be a multiple of eight) of single-precision normals using zignor4. Fills in in the pattern n1 n2 n3 n4 -n1 -n2 -n3 -n4 to achieve antithetic variance reduction.

procedure grsvd(m,n: integer; withu, withv: Boolean; a, q, u, v: Darray);

Implements Golub and Reinsch's algorithm for Singular Value Decomposition of a matrix. Handles the case m>=n, which is what we need: m is number of rows, n is number of columns.

procedure setupBytable;

Creates a bond yield table to be indexed by bond price, allowing us to remove the expensive calls to Power function (log and exp) that would otherwise be needed to calculate the yield on the 5 year zero-coupon bond from procedure setupT-Trail.

procedure setupZeros(bumpInd: integer);

Creates a set of zero coupon bond prices from current Treasury yields and an assumed coupon rate. Can bump one of the spot or forward one-year forward rates to allow for computation of interest-rate exposures.

procedure setupCovar;

Creates covariance matrices from gamma vectors (as defined in Libor Market Model forward measure equations) and an assumed scaling factor to allow matching of current market implied volatility (e.g. for swaptions or Treasury bond options) while preserving correlation structure of interest rate changes from historical data.

procedure expVec(exparg, expres: Sarray; n: integer);

A vectorized, SIMDized Chebyshev expansion for the exponential with a maximum absolute error of 3e-7 on range [−1,1]. Vector length must be a multiple of eight. Between 10 and 30 times as fast as built-in exponential function on Pentium III and Pentium 4 machines.

procedure vwgt(vout: Sarray; v1, v2: Sarray; n: integer; w2: single);

This is a vectorized and unrolled replacement for the expression:

for $i$ := 0 to $n-1$ do $vout[i]:=v1[i]+w2*v2[i]$;

procedure vfoopf(vout: Sarray; vin: Sarray; n: integer);

This is a vectorized and unrolled replacement for the expression:

for $i := 0$ to $n-1$ do $vout[i] := v1f[i]/(1+v1f[i])$;

It uses SIMD instructions and Newton's method for reciprocals to avoid the horrendously slow (relatively!) Pentium floating point division instruction.

procedure setupTTrail(bumpInd: integer);

This is a Delphi translation of the procedure gen_t5trail described above.

The strategy is to work with a "chunk" (512-element vector) at a time of the yield curve scenarios to be generated. The working set of chunks then fits in a typically-sized L2 cache (e.g. 256 Kb), and the chunks themselves are short enough that they will fit into the L1 cache (which might be 8 Kb or 16 Kb) and can be used like Cray vector registers for accumulation by the vwgt procedure. This is only a sensible strategy because r1279 and zignor4 already run out of the cache.

procedure TForm1.Button1Click(Sender: TObject);

Gets the present value of the ending account value for a traditional declared rate deposit product, by compounding forward at assumed credited interest rates as entered by the user and then discounting using computed zero-coupon bond yields.

procedure updateHLNoPre(hvec, lvec: Sarray; n: integer; netr, c, beta0, beta1, beta2: double);

Updates NA-GARCH variables H and L (instantaneous vol and log of stock index) without doing any prefetching, i.e. assuming that our NA-GARCH "chunk" strategy is working well and that most of the vectors needed will be in the Level 2 cache. The chunk size here is larger than for SetupTTrail since we're not using the L1 cache as vector registers.

procedure nagarch_monte_naive_gen(S, r, d, T: double; obsToGen: integer; sd0: double; lambda, beta0, beta1, beta2, c: double; obsPerYear, nscen: integer; lnsivec, sivec, hvec: Sarray);

This procedure generates terminal NA-GARCH values for a "chunk" of equity index scenarios. The chunk size is selected to achieve optimal use of the L2 cache. The parameters are:

S is the current stock index (usually the last value of S_past unless the averaging points do not coincide with freq X is the strike r is the risk-free rate, d is the dividend, both continuous T is the time until maturity sd0 is the implied volatility procedure genNagarchSI;

This procedure generates terminal NA-GARCH values for an entire set of equity index scenarios, using procedure nagarch_monte_naive_gen to generate values for a chunk of scenarios at a time for cache efficiency. We set lambda to zero (i.e. force the risk-neutral setting) since our purpose is option valuation.

function getPVWithBump(bumpInd: integer): double;

This function calls setupTTrail repeatedly, once for each chunk of the interest rate scenarios to be used, to get a simulated set of future yield curves to which the fixed-income-linked crediting parameters can be applied to calculate a chunk of fixed-income-linked index credit components. The values of a chunk of equity-linked index credit components are also calculated, and these are combined in accordance with the product's crediting mechanics.

bumpInd indicates which forward rate if any to "bump" (perturb) in calculating the sensitivities of the product price with respect to changes in the yield curve. If bumpInd is zero then the unperturbed yield curve is used.

procedure TForm1.Button2Click(Sender: TObject);

This procedure calculates the price of an index-offset deposit product by calling genNagarchSI, to generate NA-GARCH equity index scenarios with the interest rate dependency factored out, and getPVWithBump(0), to calculate the index credit components and their present values.

procedure TForm1.Button3Click(Sender: TObject);

Calculates zero prices from Treasury yields and an assumed annual coupon rate. Although Treasury coupons are actually semi-annual, the purpose here is to be able to calibrate to published sources for coupon and zero-coupon yields like the Wall Street Journal (for example).

procedure TForm1.Button4Click(Sender: TObject);

Gets index offset deposit product interest sensitivities by by calling genNagarchSI (to generate NA-GARCH equity index scenarios with the interest rate dependency factored out) and getPVWithBump repeatedly with different bump arguments. For this design have to do bumps out to roughly twice the term to get the proper sensitivities, which depend on five-year Treasuries even at year 4 and hence on forward rates past the end of the term.

Note that because of the "factoring property" of the NA-GARCH generated stock index scenarios described above, genNagarchSI only has to be called once. The procedure getPVWithBump supplies both the correct accumulation factor and the correct discount factor to use with the stock index scenarios for each perturbed yield curve.

Program Initialization

The initialization steps for the program are to initialize the custom memory allocator, to initialize the r1279 random number generator, to initialize the ziggurat normal random number generator, and to set up the precomputed bond yield table referenced by procedure setupTTrail.

Method of Operation

The program employs a Graphical User Interface accepting user input in the fields as labelled in the screen shots described below, and calculates the price of the index-offset deposit product when the bottom "Get PV" button has been pushed. Calculation of interest rate exposures is also supported so that the issuer can determine an effective initial investment strategy for the product, since as described above the traditional interest rate exposure measures of duration and convexity are not useful for risk management for this product.

Screen Shots

The figures and descriptions are meant to be read in order.

Screen Shot 1 (FIG. 1)

This figure shows how the program can be used to calculate the price and interest-rate sensitivities of a traditional declared rate annuity. A current Treasury yield curve has been input and assumed coupons stripped to provide zero-coupon bond yields. An assumed declared rate for a traditional declared rate annuity has been entered and the top "Get PV" button pressed to compute the present value of the payoff at the end of the accumulation period as 0.99858. The parameters for the index-offset deposit product have been set so that the equity-linked allocation is zero, and the upside and downside participation rates in the change in zero-coupon Treasury yields are zero, effectively reproducing the traditional declared rate annuity as a special case. As a result, pushing the bottom "Get PV" button calculates the same present value, to within the random variation entailed by the use of a finite number (50,000) of scenarios (Monte Carlo samples from the yield curve). The "Vol vs. Historical" field has been set to reproduce the price of Treasury-indexed or Libor-indexed options available in the marketplace.

Pushing the "Get Exposures" button has calculated the sensitivity of the price with respect to each of the one-year Treasury rate (labelled 1), the one-year forward one-year Treasury rate (labelled 2), and so on, out to the 14-year forward one-year Treasury rate (labelled 15). The sensitivities from 8 onward differ from zero only because of the random variation in the finite number of Monte Carlo scenarios.

The sum of the exposures is the effective duration, i.e. the sensitivity of the product to a parallel movement of the entire yield curve. This is a useful measure for this type of product since the exposures all have the same sign, and their magnitudes are similar—aggregating them does not lose much information.

The interpretation of the sensitivities is that a 1% increase in the one-year Treasury rate would decrease the price of the product by 0.01*0.9843, that a 1% increase in the one-year forward one-year Treasury rate would decrease the price by 0.01*0.9768, and so on.

Screen Shot 2 (FIG. 2)

This figure shows how the program can be used to calculate the price and interest rate sensitivities of a product with fixed-income-linked index credits with the equity-index allocation still at zero. In this example the floor rate and the initial value of the base rate are the same, and the upside and downside participation rates in the change in Treasury yields are both 100%. The floor rate and base rate have been selected to roughly reproduce the price obtained by clicking the bottom "Get PV" button in the previous example.

Note that the interest sensitivities show a completely different pattern than in the previous example, with the following key differences:

The sensitivities in the first seven years ((the term of the product) decline much more sharply than in the first example;

There are significant non-zero interest rate sensitivities after year seven; and The sensitivities change sign sharply between years seven and eight.

These differences occur because of the linkage between Treasury rates and index credits. If, for example, the seven-year forward one-year rate increases (exposure labelled 8 in the diagram), then this increases the zero-coupon bond yields entering the crediting formula for six of the seven years in the product term, without affecting the rate at which they should be discounted. This drives the price up, so the exposure has a positive sign. If, by way of contrast, the three-year forward one-year rate (exposure labeled 4 in the diagram), then the index credit reflects higher Treasury yields for roughly half the term (driving the price up), and the discount factor to apply to the index credits is increased (driving the price down), so the effect is mixed.

It is clear that summing the individual exposures could give a very misleading idea of the interest rates sensitivities of the product. To put it another way, duration is not a very good tool for managing for the interest-rate risk presented by this type of product.

Screen Shot 3 (FIG. 3)

This figure shows how the program can be used to calculate the price and interest rate sensitivities of a product with a constant base rate and with an equity-index allocation of 50%. The base rate has been selected to roughly reproduce the price obtained by clicking the bottom "Get PV" button in the previous example.

The interest rate exposures are similar in pattern to the first example, but scaled down to reflect the fixed-income-linked allocation of only 50%.

Note that the base rate here is actually higher than the credited rate on the traditional declared rate annuity. This effect may be even more pronounced if the issuer can earn significant spreads over Treasury yields, and contributes to the attractiveness of the product to consumers.

Screen Shot 4 (FIG. 4)

This figure shows how the program can be used to calculate the price and interest rate sensitivities of a product with a Treasury-linked base rate and with an equity-index allocation of 50%. The base rate has been selected to roughly reproduce the price obtained by clicking the bottom "Get PV" button in the previous example.

Note that the interest rate exposures are a hybrid of those in the previous two examples. There's still a sign change between years seven and eight, but it's smaller in magnitude because the Treasury-linkage only affects the fixed-income-linked index credit component, which is calculated on 50% of the deposit.

Screen Shot 5 (FIG. 5)

This figure is similar to the previous one, except that an equity participation rate of 75% has been introduced. The sharp increase in the base rate compared with the previous example demonstrates that the equity participation rate provides additional flexibility in structuring an attractive product.

We claim:

1. A computer-based method for determining a value of an index-offset deposit product, comprising the steps of:
    a) determining a cost for an equity-linked credit component and a cost for a fixed-income-linked credit component
        a. such that a total index credit comprises a sum of said equity-linked credit component and said fixed-income linked credit component and is at least equal to a specific guaranteed amount;
    b) summing said equity-linked credit component cost, said fixed-income-linked credit component cost, and a present value of principal to determine said value of said index-offset deposit product and
    c) displaying said value of said index-offset deposit product.

2. The invention of claim 1 wherein said index-offset deposit product comprises an indexed deferred annuity.

3. The invention of claim 1 wherein said index-offset deposit product comprises an indexed life insurance product.

4. The invention of claim 1 wherein said index-offset deposit product comprises an indexed certificate of deposit.

5. The invention of claim 1 wherein said specific guaranteed amount comprises a percentage of said principal.

6. The invention of claim 1 wherein said equity-linked credit component comprises a negative value.

7. A computerized method of managing an index offset product, said method comprising the steps of:
    providing a purchaser of said product with a notional allocation of principal to an equity linked allocation;
    providing said purchaser of said product with a notional allocation of principal to a fixed income linked allocation;
    computing an equity linked credit component;
    computing a fixed income linked credit component;
    computing a non-negative index credit from said equity linked credit component and said fixed-income linked credit component; and
    displaying said non-negative index credit from said equity linked credit component and said fixed income linked credit component;
    paying out at least a specific percentage of principal.

8. The invention of claim 7 wherein said equity-linked credit component is a negative value.

9. The invention of claim 7 wherein said equity-linked credit component is a non-negative value.

10. The invention of claim 7 further comprising the step of basing said index credit component for said equity notional allocation on a published equity index.

11. The invention of claim 7 further comprising the step of basing said index credit component for said equity notional allocation on the S&P 500 index.

12. The invention of claim 7 further comprising the step of basing said index credit component for said equity notional allocation on the NASDAQ index.

13. The invention of claim 7 further comprising the step of basing said index credit component for said fixed-income-linked notional allocation on an external index rate.

14. The invention of claim 7 further comprising the step of basing said index credit component for said fixed-income-linked notional allocation on a United States Treasury index rate.

15. The invention of claim 7 wherein said notional allocation determination is made by an issuer of said product.

16. The invention of claim 7 wherein said notional allocation determination is selected by a purchaser of said product from a set of possible notional allocations supplied by an issuer of said product.

17. The invention of claim 7 further comprising the step of paying said specific percentage of principal at an end of a specified term.

18. The invention of claim 17 wherein said term comprises a three year term.

19. The invention of claim 7 wherein said index offset product comprises an indexed deferred annuity.

20. The invention of claim 7 wherein said index offset product comprises an indexed certificate of deposit.

21. The invention of claim 7 wherein said index offset product comprises an indexed life insurance product.

22. The invention of claim 7 further comprising the step of paying out at least said specific percentage of principal to a purchaser of said index-offset deposit product.

* * * * *